US008671280B2

(12) United States Patent
Yoshioka

(10) Patent No.: US 8,671,280 B2
(45) Date of Patent: Mar. 11, 2014

(54) PROGRAM, METHOD AND APPARATUS FOR MANAGING ELECTRONIC DOCUMENTS

(75) Inventor: Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 408 days.

(21) Appl. No.: 12/354,478

(22) Filed: Jan. 15, 2009

(65) Prior Publication Data

US 2009/0132814 A1  May 21, 2009

Related U.S. Application Data

(63) Continuation of application No. PCT/JP2006/315477, filed on Aug. 4, 2006.

(51) Int. Cl.
*H04L 29/06* (2006.01)
(52) U.S. Cl.
USPC ............... 713/179; 713/176; 726/26; 726/27; 705/76; 705/35
(58) Field of Classification Search
USPC ........... 713/176, 179; 726/26, 27, 30; 705/52, 705/53, 54, 75, 76, 35; 902/1, 2
See application file for complete search history.

(56) References Cited

U.S. PATENT DOCUMENTS

| | | | | |
|---|---|---|---|---|
| 5,465,299 | A * | 11/1995 | Matsumoto et al. | 713/176 |
| 6,021,202 | A * | 2/2000 | Anderson et al. | 705/54 |
| 6,209,095 | B1 * | 3/2001 | Anderson et al. | 713/176 |
| 6,601,172 | B1 * | 7/2003 | Epstein | 713/178 |
| 6,609,200 | B2 * | 8/2003 | Anderson et al. | 713/176 |
| 7,069,443 | B2 * | 6/2006 | Berringer et al. | 713/180 |
| 7,162,635 | B2 * | 1/2007 | Bisbee et al. | 713/176 |
| 7,167,986 | B2 * | 1/2007 | Hughes et al. | 713/178 |

(Continued)

FOREIGN PATENT DOCUMENTS

| | | |
|---|---|---|
| EP | 1 498 799 A2 | 1/2005 |
| JP | A 1-163871 | 6/1989 |

(Continued)

OTHER PUBLICATIONS

Bertino, Elisa; Carminati, Barbara; Ferrari, Elena; Thuraisingham, Bhavani; Gupta, Amar; "Selective and Authentic Third-Party Distribution of XML Documents", IEEE Transactions on Knowledge and Data Engineering, vol. 16, Issue 10, Oct. 2004, pp. 1263-1278.*

(Continued)

*Primary Examiner* — Victor Lesniewski
(74) *Attorney, Agent, or Firm* — Greer Burns & Crain Ltd.

(57) ABSTRACT

An electronic document management program, an electronic document management method and an electronic document management apparatus acquire a plurality of pieces of part identification information respectively identifiably expressing a plurality of parts of document information and a digital signature corresponding to the document information, acquire the preparation type, the preparer's name and the time and date of preparation of the document information as tracing information of the document information, manage the part identification information, the digital signature and the tracing information in association with each other and present information relating to the tracing information to the user in response to a request from the user. Additionally, they acquire new document information and tracing information according to a directive from the user.

12 Claims, 25 Drawing Sheets

(56) References Cited

U.S. PATENT DOCUMENTS

| | | | |
|---|---|---|---|
| 7,194,435 B1* | 3/2007 | Sforzo | 705/37 |
| 7,315,866 B2* | 1/2008 | Wu et al. | 1/1 |
| 7,526,645 B2* | 4/2009 | Miyazaki et al. | 713/167 |
| 7,555,649 B1* | 6/2009 | Schwenk et al. | 713/176 |
| 7,568,101 B1* | 7/2009 | Catorcini et al. | 713/176 |
| 7,853,515 B2* | 12/2010 | Harrison, Jr. | 705/37 |
| 7,941,667 B2* | 5/2011 | Miyazaki et al. | 713/176 |
| 8,108,906 B2* | 1/2012 | Miyazaki et al. | 726/2 |
| 8,402,276 B2* | 3/2013 | Berringer et al. | 713/176 |
| 2002/0019937 A1* | 2/2002 | Edstrom et al. | 713/168 |
| 2004/0230531 A1* | 11/2004 | Weiss | 705/53 |
| 2004/0255116 A1* | 12/2004 | Hane et al. | 713/161 |
| 2005/0120217 A1* | 6/2005 | Fifield et al. | 713/176 |
| 2005/0132201 A1* | 6/2005 | Pitman et al. | 713/176 |
| 2006/0075245 A1* | 4/2006 | Meier | 713/176 |
| 2006/0117183 A1* | 6/2006 | Hatano et al. | 713/176 |
| 2007/0220614 A1* | 9/2007 | Ellis et al. | 726/27 |

FOREIGN PATENT DOCUMENTS

| | | |
|---|---|---|
| JP | 2000-181974 | 6/2000 |
| JP | A 2000-285024 | 10/2000 |
| JP | A 2001-117820 | 4/2001 |
| JP | 2003-058797 | 2/2003 |
| JP | A 2004-364070 | 12/2004 |
| JP | A 2005-51734 | 2/2005 |
| JP | 2005-309697 | 11/2005 |
| JP | A 2006-60722 | 3/2006 |
| JP | A 2006-60724 | 3/2006 |
| JP | A 2006-146772 | 6/2006 |

OTHER PUBLICATIONS

English translation of the International Preliminary Report on Patentability; Feb. 10, 2009.

Miyazaki et al., "A Digital document Sanitizing Scheme with Disclosure Condition Control," 2004 Symposium on Cryptography and Information Security, Sendai, Japan, Jan. 2004, pp. 515-520 (with English language Abstract).

Miyazaki et al., "Digital Document Sanitizing Problem," IPSJ SIG Technical Report, 2003-CSEC-22 (9), Jul. 2003, pp. 61-67 (with English language Abstract).

Office Action issued by the Patent Office of Japan for related JP Application No. 2008-527626 mailed Aug. 30, 2011 (with machine generated English language translation).

* cited by examiner

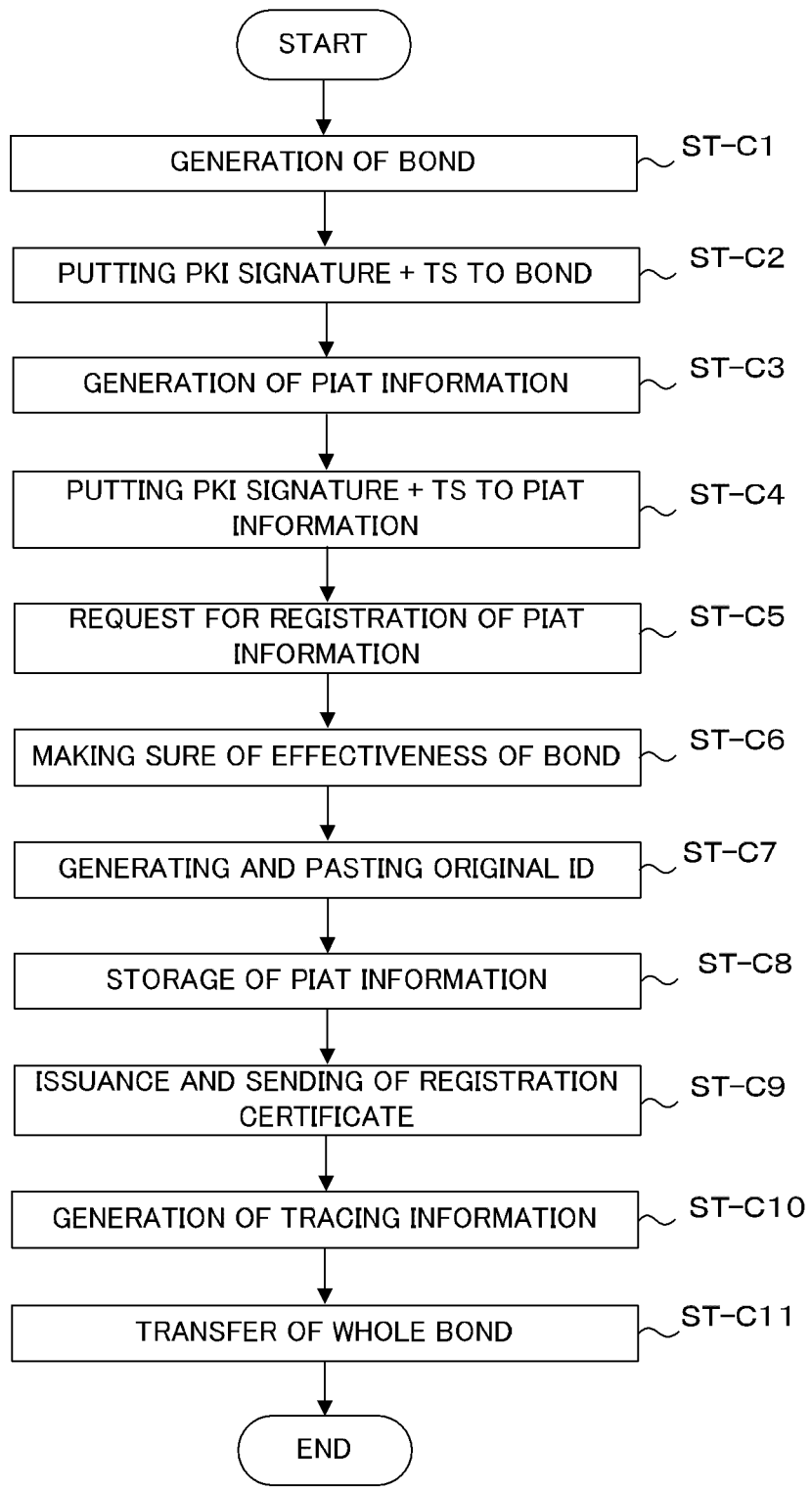

FIG. 5

(a)
```
BOND_EDITION 1
<BOND INFORMATION ver="1",type="org">
    <AMOUNT DUE R="123">50,000,000</AMOUNT DUE>
    <DATE DUE R="456">JUNE 1, 2006</DATE DUE>
    <PLACE OF PAYMENT R="789">MIZUNO BANK</PLACE OF PAYMENT>
    <TRANSFEREE R="012">SATO BUILDING COMPANY</TRANSFEREE>
    <DATE OF ISSUANCE R="345">MARCH 1, 2006</DATE OF ISSUANCE>
    <ISSUER R="678">HANAKO SUZUKI</ISSUER>
</BOND INFORMATION>

SIGNATURE OF MS HANAKO SUZUKI (80-A) + TIME STAMP
```

(b)
```
PIAT_EDITION 1
<PIAT ver="1">
    <AMOUNT DUE>abcde</AMOUNT DUE>
    <DATE DUE>fghij</DATE DUE>
    <PLACE OF PAYMENT>klmno</PLACE OF PAYMENT>
    <TRANSFEREE>opqrs</TRANSFEREE>
    <DATE OF ISSUANCE>tuvwx</DATE OF ISSUANCE>
    <ISSUER>yzabc</ISSUER>
</PIAT>

SIGNATURE OF MS HANAKO SUZUKI (80-A) + TIME STAMP
```

FIG. 6

| ORIGINAL ID | PREPARATION TYPE | PREPARER | NO. OF EDITION | DATE OF PREPARATION |
|---|---|---|---|---|
| A0001 | NEW ISSUANCE | MS HANAKO SUZUKI | 1 | MARCH 1, 2006 8:00:00 AM |

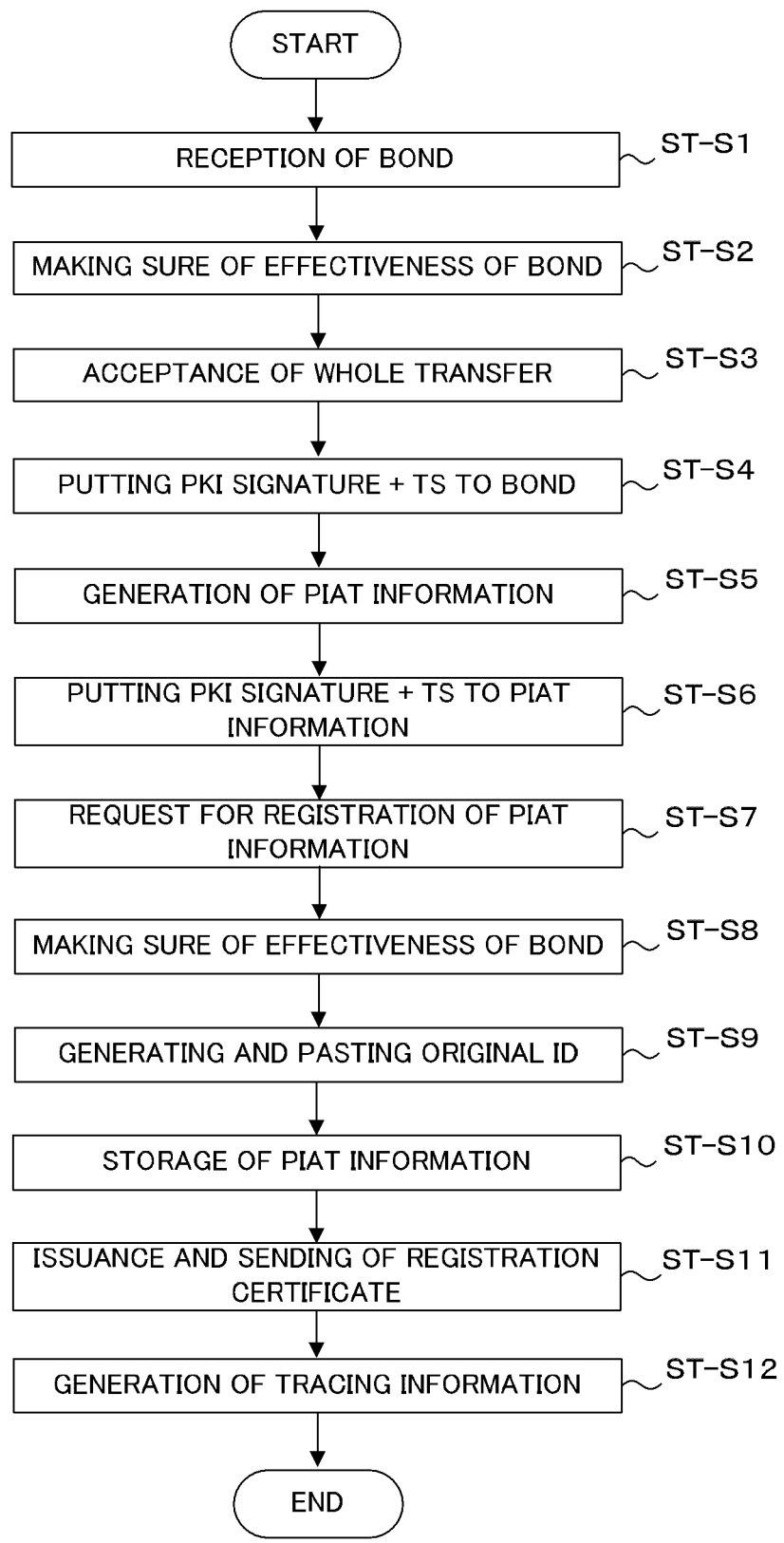

FIG. 8

(a)
BOND_EDITION 2

```
<BOND INFORMATION ver="2",type="org">
    <AMOUNT DUE R="123">50,000,000</AMOUNT DUE>
    <DATE DUE R="456">JUNE 1, 2006</DATE DUE>
    <PLACE OF PAYMENT R="789">MIZUNO BANK</PLACE OF PAYMENT>
    <TRANSFEREE R="012">SATO BUILDING COMPANY</TRANSFEREE>
    <DATE OF ISSUANCE R="345">MARCH 1, 2006</DATE OF ISSUANCE>
    <ISSUER R="678">HANAKO SUZUKI</ISSUER>
</BOND INFORMATION>
```

SIGNATURE OF SATO BUILDING COMPANY (80-B) + TIME STAMP

⇩

(b)
PIAT_EDITION 2

```
<PIAT ver="2">
    <AMOUNT DUE>abcde</AMOUNT DUE>
    <DATE DUE>fghij</DATE DUE>
    <PLACE OF PAYMENT>klmno</PLACE OF PAYMENT>
    <TRANSFEREE>opqrs</TRANSFEREE>
    <DATE OF ISSUANCE>tuvwx</DATE OF ISSUANCE>
    <ISSUER>yzabc</ISSUER>
</PIAT>
```

SIGNATURE OF SATO BUILDING COMPANY (80-B) + TIME STAMP

FIG. 9

| ORIGINAL ID | PREPARATION TYPE | PREPARER | NO. OF EDITION | DATE OF PREPARATION |
|---|---|---|---|---|
| A0001 | NEW ISSUANCE | MS HANAKO SUZUKI | 1 | MARCH 1, 2006 8:00:00AM |
| A0002 | WHOLE TRANSFER | SATO BUILDING COMPANY | 2 | MARCH 1, 2006 8:30:00AM |

FIG. 12

| ORIGINAL ID | PREPARATION TYPE | PREPARER | NO. OF EDITION | DATE OF PREPARATION |
|---|---|---|---|---|
| A0001 | NEW ISSUANCE | MS HANAKO SUZUKI | 1 | MARCH 1, 2006 8:00:00 AM |
| A0002 | WHOLE TRANSFER | SATO BUILDING COMPANY | 2 | MARCH 1, 2006 8:30:00 AM |
| A5001 | ISSUANCE OF DIVIDED BOND | SATO BUILDING COMPANY | 2A-1 | MARCH 10, 2006 10:00:00 AM |

FIG. 14

DIVIDED BOND_EDITION 2A-2

(a)
```
<BOND INFORMATION ver="2a-2",type="part">
    <AMOUNT DUE R="901">10,000,000</AMOUNT DUE>
    <DATE DUE R="456">JUNE 1, 2006</DATE DUE>
    <PLACE OF PAYMENT R="789">MIZUNO BANK</PLACE OF PAYMENT>
    <TRANSFEREE R="234">YAMADA LUMBER</TRANSFEREE>
    <DATE OF ISSUANCE R="345">MARCH 1, 2006</DATE OF ISSUANCE>
    <ISSUER R="678">HANAKO SUZUKI</ISSUER>
</BOND INFORMATION>
```

SIGNATURE OF YAMADA LUMBER (80-C) + TIME STAMP

PIAT_EDITION 2A-2

(b)
```
<PIAT ver="2a-2">
    <AMOUNT DUE>qwert</AMOUNT DUE>
    <DATE DUE>fghij</DATE DUE>
    <PLACE OF PAYMENT>klmno</PLACE OF PAYMENT>
    <TRANSFEREE>zxcvb</TRANSFEREE>
    <DATE OF ISSUANCE>tuvwx</DATE OF ISSUANCE>
    <ISSUER>yzabc</ISSUER>
</PIAT>
```

SIGNATURE OF YAMADA LUMBER (80-C) + TIME STAMP

FIG. 15

| ORIGINAL ID | PREPARATION TYPE | PREPARER | NO. OF EDITION | DATE OF PREPARATION |
|---|---|---|---|---|
| A0001 | NEW ISSUANCE | MS HANAKO SUZUKI | 1 | MARCH 1, 2006 8:00:00 AM |
| A0002 | WHOLE TRANSFER | SATO BUILDING COMPANY | 2 | MARCH 1, 2006 8:30:00 AM |
| A5001 | ISSUANCE OF DIVIDED BOND | SATO BUILDING COMPANY | 2A-1 | MARCH 10, 2006 10:00:00 AM |
| A9001 | TRANSFER OF DIVIDED BOND | YAMADA LUMBER | 2A-2 | MARCH 10, 2006 10:30:00 AM |

FIG. 17

| ORIGINAL ID | PREPARATION TYPE | PREPARER | NO. OF EDITION | DATE OF PREPARATION |
|---|---|---|---|---|
| A0001 | NEW ISSUANCE | MS HANAKO SUZUKI | 1 | MARCH 1, 2006 8:00:00 AM |
| A0002 | WHOLE TRANSFER | SATO BUILDING COMPANY | 2 | MARCH 1, 2006 8:30:00 AM |
| A5001 | ISSUANCE OF DIVIDED BOND | SATO BUILDING COMPANY | 2A-1 | MARCH 10, 2006 10:00:00 AM |
| A9001 | TRANSFER OF DIVIDED BOND | YAMADA LUMBER | 2A-2 | MARCH 10, 2006 10:30:00 AM |
| A5002 | ISSUANCE OF DIVIDED BOND | SATO BUILDING COMPANY | 2B-1 | MARCH 10, 2006 11:00:00 AM |

FIG. 18

DIVIDED BOND_EDITION 2B-2

(a)
```
<BOND INFORMATION ver="2b-2",type="part">
    <AMOUNT DUE R="567">5,000,000</AMOUNT DUE>
    <DATE DUE R="456">JUNE 1, 2006</DATE DUE>
    <PLACE OF PAYMENT R="789">MIZUNO BANK</PLACE OF PAYMENT>
    <TRANSFEREE R="890">KIMURA CEMENT</TRANSFEREE>
    <DATE OF ISSUANCE R="345">MARCH 1, 2006</DATE OF ISSUANCE>
    <ISSUER R="678">HANAKO SUZUKI</ISSUER>
</BOND INFORMATION>
```
SIGNATURE OF KIMURA CEMENT (80-D) + TIME STAMP

PIAT_EDITION 2B-2

(b)
```
<PIAT ver="2b-2">
    <AMOUNT DUE>tyhgf</AMOUNT DUE>
    <DATE DUE>fghij</DATE DUE>
    <PLACE OF PAYMENT>klmno</PLACE OF PAYMENT>
    <TRANSFEREE>poiuy</TRANSFEREE>
    <DATE OF ISSUANCE>tuvwx</DATE OF ISSUANCE>
    <ISSUER>yzabc</ISSUER>
</PIAT>
```
SIGNATURE OF KIMURA CEMENT 80D (80-D) + TIME STAMP

FIG. 19

| ORIGINAL ID | PREPARATION TYPE | PREPARER | NO. OF EDITION | DATE OF PREPARATION |
|---|---|---|---|---|
| A0001 | NEW ISSUANCE | MS HANAKO SUZUKI | 1 | MARCH 1, 2006 8:00:00 AM |
| A0002 | WHOLE TRANSFER | SATO BUILDING COMPANY | 2 | MARCH 1, 2006 8:30:00 AM |
| A5001 | ISSUANCE OF DIVIDED BOND | SATO BUILDING COMPANY | 2A-1 | MARCH 10, 2006 10:00:00 AM |
| A9001 | TRANSFER OF DIVIDED BOND | YAMADA LUMBER | 2A-2 | MARCH 10, 2006 10:30:00 AM |
| A5002 | ISSUANCE OF DIVIDED BOND | SATO BUILDING COMPANY | 2B-1 | MARCH 10, 2006 11:00:00 AM |
| A9002 | TRANSFER OF DIVIDED BOND | KIMURA CEMENT | 2B-2 | MARCH 10, 2006 11:30:00 AM |

FIG. 22

| ORIGINAL ID | PREPARATION TYPE | PREPARER | NO. OF EDITION | DATE OF PREPARATION |
|---|---|---|---|---|
| A0001 | NEW ISSUANCE | MS HANAKO SUZUKI | 1 | MARCH 1, 2006 8:00:00 AM |
| A0002 | WHOLE TRANSFER | SATO BUILDING COMPANY | 2 | MARCH 1, 2006 8:30:00 AM |
| A5001 | ISSUANCE OF DIVIDED BOND | SATO BUILDING COMPANY | 2A-1 | MARCH 10, 2006 10:00:00 AM |
| A9001 | TRANSFER OF DIVIDED BOND | YAMADA LUMBER | 2A-2 | MARCH 10, 2006 10:30:00 AM |
| A5002 | ISSUANCE OF DIVIDED BOND | SATO BUILDING COMPANY | 2B-1 | MARCH 10, 2006 11:00:00 AM |
| A9002 | TRANSFER OF DIVIDED BOND | KIMURA CEMENT | 2B-2 | MARCH 10, 2006 11:30:00 AM |
| A0003 | RENEWAL | SATO BUILDING COMPANY | 3 | MARCH 10, 2006 12:00:00 |

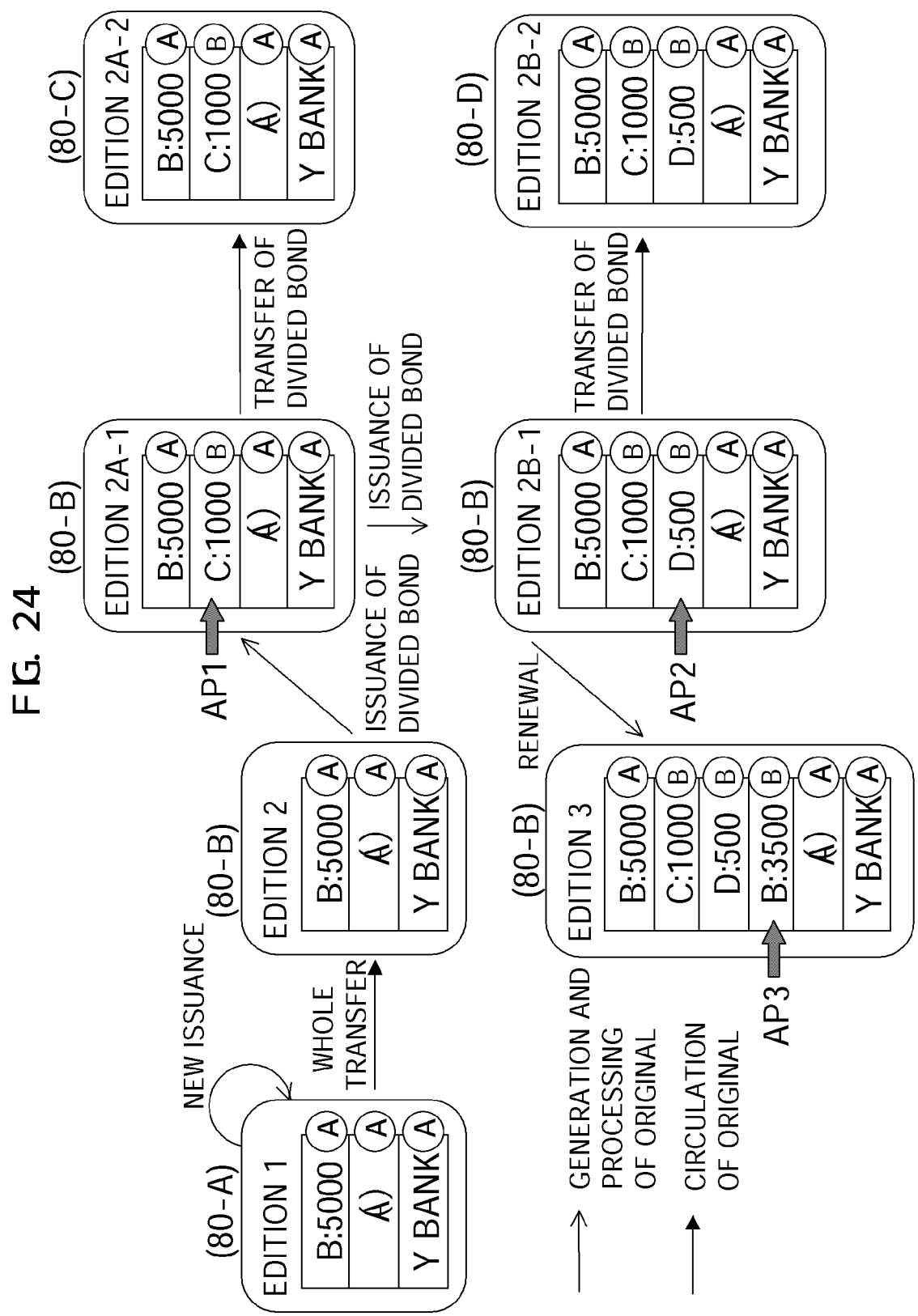
F I G. 24

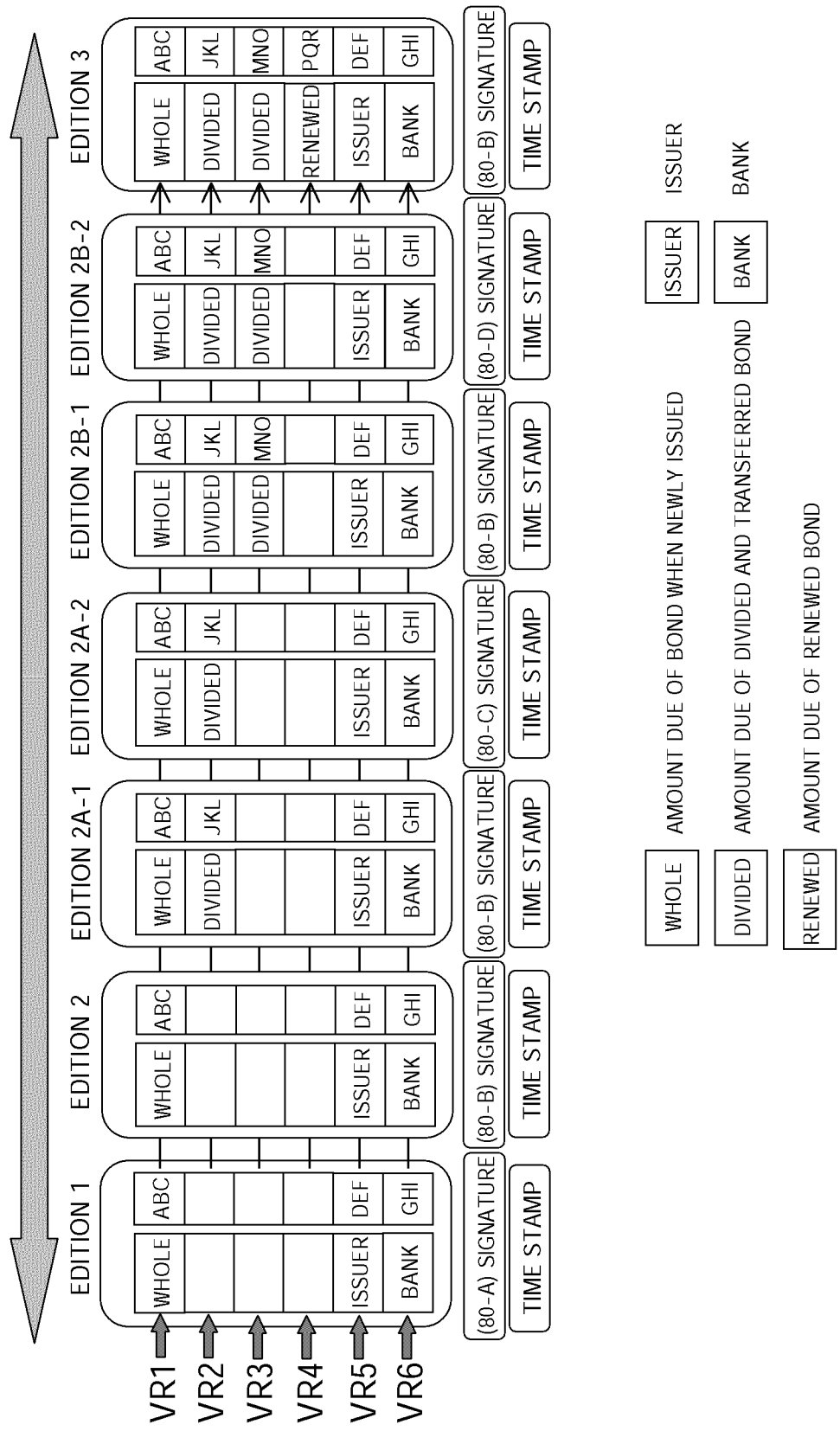

PROGRAM, METHOD AND APPARATUS FOR MANAGING ELECTRONIC DOCUMENTS

This application is a Continuation under 35 U.S.C 111(a) of International Application No. PCT/JP2006/315477, filed Aug. 4, 2006.

TECHNICAL FIELD

The present invention relates to an electronic document management program, an electronic document management method and an electronic document management apparatus. The present invention generally relates to a supportive technique for, for example, dividing an electronic document, assuring the originality and the traceability thereof when distributing it to a plurality of entities and making it possible to testify the correctness thereof to a third party.

BACKGROUND ART

As a result of the development of IT technologies in recent years, there is a gradual transition of the form of administrative documents, account books and written contracts of private enterprises from conventional paper documents to electronic (digital) documents for both use and storage. More specifically, as scanners have become widely available, it is now easy to store documents as electronic data. Additionally, as high definition image scanners are being put to practical use, it is now permitted to store official documents as electronic documents instead of paper documents on condition that certain security requirements are met, although such a form of document storage was not authorized before (as a result of the enforcement of the e-Document Law in April, 2005).

On the other hand, as the demand for electronic storage of documents increases, the necessity of storing and managing electronic documents in safe becomes strong. In order to electronically store the documents that used to be stored as paper documents, maintaining the admissibility of evidence thereof, it is believed that certain technical requirements such as "detection and prevention of falsification", "identification of document author", "access management and control" and "history management" need to be met. Existing document management systems are functionally insufficient for satisfying these requirements and the development and marketing of "originality assurance systems" that satisfy these technical requirements is in rapid progress.

The most popularly employed security element techniques for "originality assurance system" include those of digital signature and time stamp. With the technique of digital signature, it is possible to identify the author of a document and testify and confirm that the document has not been altered (unfalsifiedness) since the time of preparation to the third party. With the technique of time stamp, it is possible to prove the established time of an electric document so that it is desirable to use such a technique in addition to providing the function of digital signature.

The conventional concept of originality assurance that can be realized by utilizing the above-described techniques is applicable to documents whose originals can clearly be located as in the case of securely managing and storing originals of established final forms as paper documents in keyed stack rooms.

In such an environment, the techniques of digital signature and time stamp are very effective for assuring the identify and unfalsifiedness of an electronic document. Known techniques for securing the originality of an electronic document include those described in Patent Documents 1 and 2 listed below and Patent Document 3 listed below describes a known technique of solving the electronic document sanitizing problem, while Non-Patent Document 4 listed below describes a known electronic document sanitizing technique of making it possible to determine if it is permissible to additionally sanitize a disclosed document or not under control.

IPSJ SIG Notes, "Digital Document Sanitizing Problem" (2003 Jul. 17) (2003-CSEC-22-009) proposes a solution system. Additionally, SCIS2004 Paper "A Digital Document Sanitizing Scheme with Disclosure Condition Control" proposes an electronic document sanitizing technique of making it possible to determine if it is permissible to additionally sanitize a disclosed document or not under control.

Patent Document 1: Japanese Laid-open Patent Publication No. 2000-285024
Patent Document 2: Japanese Laid-open Patent Publication No. 2001-117820
Non-Patent Document 3: IPSJ SIG Notes, "Digital Document Sanitizing Problem" (2003 Jul. 17) (2003-CSEC-22-009)
Non-Patent Document 4: SCIS2004 Paper "A Digital Document Sanitizing Scheme with Disclosure Condition Control"

DISCLOSURE OF INVENTION

Problem to be Solved by Invention

However, when considering the originality assurance of a document such as a letter of application or a letter of proposal that may directly be subjected to one or more than one additions and corrections and that one or more than one secret parts thereof may be manipulated while the document is circulated through various routes, an ordinary digital signature and an ordinary time stamp system can constitute an obstacle to such an electronic document because of the intrinsic nature of such systems. The above problem is not taken into consideration in conventional techniques of such systems and such conventional system products. In other words, such techniques and products are centered at storing complete electronic data by means of a digital signature. When an electronic document that is electronically signed is altered once, any attempt to verify the signature fails so that it is no longer possible to assure the integrity of a partly altered document.

As a technique for avoiding such a problem, a partly altered electronic document may be handled as a new edition and signed once again. Then, the signature can be verified but it is no longer possible to detect any falsification (alteration) other than the altered part or parts. Examples of authorized alterations include a document sanitizing process of an undisclosed part according to Law Concerning Access to Information Held by Administrative Organs and Personal Information Protection Law but there remains a problem that any unauthorized alteration made to a disclosed part simultaneously with a document sanitizing process cannot be detected.

Additionally, the Electronic Bond System may be a good example of dividing an electronic document and distributing the divided documents to a plurality of entities. Now, a promissory note will be described below as an example of bond. With the ordinary promissory note system that is run by using paper notes, it is not authorized to divide a bond for transfer and a bond can only be transferred as a whole with the amount due shown on the surface.

In other words, the system is designed to maximally exploit the value of a negotiable instrument of paper on a prerequisite that it is a physical entity and make the paper itself circulate through a plurality of persons. Since the handwriting (signature) and the seal of the issuer, the signature of the representative of the payable financial machinery and the sheet of paper dedicated to the promissory note are circulated with the note, it is easy to check if the amount due, the issuer of the note and/or the place of payment (the payable financial machinery) shown on the surface have been altered or not so that the receiver of the note can reliably see if the originality of the note has been secured or not.

Additionally, since the signatures and the seals of endorsers are successively shown, it is possible to trace and testify how it is circulated and transferred. Now, for the purpose of propagation and promotion of IT technologies in the current IT society (e-Japan strategy etc.), a legal system enforcement project for realizing electronic bonds and circulating them among a plurality of entities while maintaining the level of originality and traceability equivalent to that of paper notes has been and are being discussed among the related administrative ministries and agents.

According to the draft bill, a bond may be divided and bonds produced by such a division may be transferred although such a division is not currently authorized for paper bonds. Now, techniques and systems for dissolving threats to security that may arise and maintaining the security of such divided bonds are being discussed.

While the following steps may be followed for a system for assuring and maintaining the originality and the traceability of an electronic document when it is divided and circulated, they may be accompanied by problems that will be described hereinafter. Referring to FIG. 1, the following cases where users (corporates and/or natural persons) (A), (B), (C) and (D) are involved in an environment where an electronic bond is divided and circulated will be discussed.

(Case 1)

The user (A) transfers an electronically signed bond (original) wholly to the user (B). The bond bears an amount due of ¥50 million.

(Case 2)

The user (B) copies the bond in his or her own local environment in order to divide the bond transferred from the user (A) and transfer some of the bonds produced by the division to the users (C) and (D).

(Case 3)

The user (B) processes the bond to divide it and transfer some of the bonds produced by the division to the user (C) and (D). Then, the user (B) prepares divided bonds and electronically signs them. At this time, ¥10 million are transferred to the user (C) and ¥5 million are transferred to the user (D).

(Case 4)

The user (B) transfers the electronically signed relevant divided bonds to the users (C) and (D).

(Problem 1)

The first problem is that there is no way to identify the bond (original) from which a divided bond originates. In other words, a divided bond is completely a new bond and the correspondence of the original bond and the divided bond is no longer detectable. This problem does not arise to paper because a sheet of paper is physically made to operate for a bond and endorsed by one or more than one signatures so that it can be verified with ease.

(Problem 2)

The second problem is that there is nothing to verify that a part of the description on the divided bond agrees with the corresponding part of the original bond. For example, the user (B) may intentionally (mistakenly) alter what should not be altered such as the issuer of the bond and the place of payment when the original bond is divided and the users (A), (C) and (D) should be able to make sure that the user (B) is free from wrongdoing.

In other words, something wrong is done most probably when a bond is divided and transferred because the proper amount due can be altered at that time but the bond needs to be circulated with the descriptions given by the user (A). In other words, partial originality needs to be secured to the divided bond. The handwriting (signature) and the seal of the issuer, the signature of the representative of the payable financial machinery and the sheet of paper dedicated to the promissory note are circulated in the case of paper so that they can be checked with ease.

(Problem 3)

The third problem is that there is nothing to check if the user (B) properly renewed his or her own bond after dividing the original bond into new bonds or not. For example, if the user (B) to whom the original bond of ¥50 million is wholly transferred from the user (A) divides the original bond and transferred ¥10 million to the user (C) and ¥5 million to the user (D), the user (B) properly divides the original bond when he or she renewed his or her own bond to make the amount due equal to be ¥35 million (equation of calculation: ¥50 million−¥10 million−¥5 million=¥35 million).

No problem arises when the bond is properly renewed. However, the users (A), (C) and (D) should be able to detect any falsification made by the user (B) for the intention of leaving his or her share as much as possible. Since a bond cannot be divided for transfer in the case of paper, such a requirement does not arise. This is a problem that arises when an electronic bond is divided.

(Problem 4)

The fourth problem relates to the above problem (the third problem). The user (B) who divides the original bond may make his or her own bond circulate without renewing it. The user (B) should renew his or her own bond to make the amount due equal to ¥35 million but may intentionally (mistakenly) does not do so. Then, a problem of double bond (double original) arises and the user (A) may be forced to make a double payment.

The user (A) should be able to check such a wrongdoing committed by the user (B). It is useful for the users (C) and (D) if they can check such a wrongdoing because they should be able to make sure that the divided bonds they receive is proper (and effective) and that the future payment by the issuer for the divided bonds is guaranteed. Again, since a bond cannot be divided for transfer in the case of paper, such a requirement does not arise. This is a problem that arises when an electronic bond is divided.

(Problem 5)

The fifth problem is that there is nothing to trace the bond (original bond). In other words, each of the entities should be able to check the following. The user (A) has no means of finding out where the bond he or she issued is circulating now. In the case of paper, the bond is endorsed by one or more than one signatures but history of transfer tells only that the most recent transferee is the user (B). More specifically, the user (A) possesses the stub of the bond (bearing a half of the seal and equivalent to a copy) so that it is possible to find out the person to whom the bond is wholly transferred in any future but there is no knowing how the bond circulates thereafter from the stub (copy).

One or more than one financial machineries (banks) that deal with the bond can be referred to in order to find out the route of circulation of the bond but this is a time consuming operation. In other words, there is a problem that the bond issuer cannot quickly grasp how the bond is utilized and transferred and hence if it is transferred illegally to a third party, he or she can do nothing about it.

Additionally, there is nothing for the users (C) and (D) to find out the route of circulation of the divided bonds they receive. In the case of paper, the bond can only be transferred wholly and hence the route of circulation can be traced by seeing the endorser's signature or the endorsers' signatures. While a paper bond cannot be divided and transferred, the prerequisite of traceability needs to be satisfied by electronic bonds if the idea of dividing a bond is introduced there.
(Problem 6)

The sixth problem is that there is nothing to prove that the divided bonds can be reduced to the original bond when they are combined. For example, when the divided bonds transferred from the user (B) to the users (C) and (D) (¥10 million and ¥5 million) and the renewed bond now bearing the balance (¥35 million) are combined, the total amount due should be ¥50 million=¥10 million+¥5 million+¥35 million to prove that the original bond is divided properly and, if any of the divided bonds is altered illegally, the person responsible to the illegal alteration should be made clear (clarification of the scope of responsibility).

Thus, the above problems need to be solved from the viewpoint of securing the originality and the traceability of an electronic bond when it is divided and the divided bonds are circulated.

Currently, according to the proposed electronic bond system, an electronic bond management agency is centrally established as a third party organization and all bonds are handled under the control and within the scope of responsibility of the agency. In other words, the agency supervises and controls handling of all bonds so that problems of scattering and missing may not arise to bonds because such problems can occur when bonds are handled by related parties without supervision.

The agency controls all management information and tracing information on bonds and divisions and transfers of bonds (who, to whom, to what amount and how). However, from the viewpoint of personal information protection and privacy protection, measures should be taken not to make the agency desirably possess such information.

The present invention is made to dissolve the above-described problems. The object of the present invention is to assure the originality and the traceability of an electronic bond when it is divided and circulated to a plurality of entities and to make it possible to easily testify the properness of such a division to the third party.

More specifically, the above problems are dissolved by providing a scheme by which a transferee of a divided bond can verify the trueness of the divided bond with ease and securely receive the bond and a scheme by which it is possible to trace a bond and prove the route of circulation thereof both from the upstream (e.g., the user (A)→the users (C) and (D) of the above example) and from the downstream (e.g., the users (C) and (D)→the user (A) of the above example).

Particularly, the former scheme is adapted to support an attempt of finding the original bond of a divided bond, the amount due of the original bond, how the original bond is divided and the ratio of the divided bond relative to the original bond and also seeing if the original bond is divided and issued properly and the amount due of the bond possessed by the issuer of the divided bond is correct or not.

The latter scheme provides a technique that does not allow an electronic bond management agency to control private information and privacy information (and does not hold the substances of bonds) and support operations of managing electronic bonds, securing the originality and the traceability of a bond and making it possible to testify them to the third party.

Means for Solving the Problems

According to the present invention, the above problems are dissolved by providing an electronic document management program for causing a computer to manage document information prepared as electronic information, the program including: a document information acquisition step that acquires a plurality of pieces of part identification information respectively identifiably expressing a plurality of parts of the document information and a digital signature corresponding to the document information; a tracing information acquisition step that acquires the preparation type, the preparer's name and the time and date of preparation of the document information as tracing information of the document information; and a management step that manages the part identification information and the digital signature acquired in the document information acquisition step and the tracing information acquired in the tracing information acquisition step in association with each other, presents information relating to the tracing information to the user in response to a request from the user and causes the document information acquisition step and the tracing information acquisition step to be executed in response to a directive from the user.

Preferably, the electronic document management program as defined above further includes a verification step that presents the tracing information in a predetermined format to the user and supports the verification by the user of the properness of the document information.

Preferably, in the electronic document management program as defined above, the part identification information acquired in the document information acquisition step is acquired as hash information generated by using the parts of the document information.

Preferably, in the electronic document management program as defined above, the hash information is generated by adding a random numbers to the information of each of the parts of the document information.

Preferably, in the electronic document management program as defined above, the document information is an electronic bond generated from electronic information.

Preferably, in the electronic document management program as defined above, the preparation type of the document information is at least new issuance of an electronic bond, transfer of a whole electronic bond, issuance of divided electronic bonds or transfer of one or more than one divided electronic bonds.

In another aspect of the present invention, there is provided an electronic document management method for managing document information prepared by electronic information and registered by a computer, the method including: a document information acquisition step that acquires a plurality of pieces of part identification information respectively identifiably expressing a plurality of parts of the document information and a digital signature corresponding to the document information; a tracing information acquisition step that acquires the preparation type, the preparers name and the time and date of preparation of the document information as tracing information of the document information; and a management step that manages the part identification information and the digital signature acquired in the document information acquisition step and the tracing information acquired in the tracing information acquisition step in association with each other, presents information relating to the tracing information to the user in response to a request from the user and causes the document information acquisition step and the tracing information acquisition step to be executed in response to a directive from the user.

In still another aspect of the present invention, there is provided an electronic document management apparatus for managing document information prepared by electronic information and registered by a computer, the apparatus including: a document information acquisition section that acquires a plurality of pieces of part identification information respectively identifiably expressing a plurality of parts of the document information and a digital signature corresponding to the document information; a tracing information acquisition section that acquires the preparation type, the preparer's name and the time and date of preparation of the document information as tracing information of the document information; and a management section that manages the part identification information and the digital signature acquired by the document information acquisition section and the tracing information acquired by the tracing information acquisition section in association with each other, presents information relating to the tracing information to the user in response to a request from the user and causes the document information acquisition section to acquire the document information and the tracing information acquisition section to acquire the tracing information in response to a directive from the user.

BRIEF DESCRIPTION OF THE DRAWINGS

FIG. 4 is a flowchart of a process of newly issuing an electronic bond.

FIG. 5 is a schematic illustration of an example of generation of a bond and PIAT information (1st edition).

FIG. 6 is a schematic illustration of the structure of tracing information (1st edition) of a tracing information management section.

FIG. 7 is a flowchart of a process of wholly transferring a bond.

FIG. 8 is a schematic illustration of an example of generation of a bond and PIAT information (2nd edition).

FIG. 9 is a schematic illustration of the structure of tracing information (2nd edition) of a tracing information management section.

FIG. 12 is a schematic illustration of the structure of tracing information (2a-1st edition) of a tracing information management section.

FIG. 14 is a schematic illustration of an example of generation of a bond and PIAT information (2a-2nd edition).

FIG. 15 is a schematic illustration of the structure of tracing information (2a-2nd edition) of a tracing information management section.

FIG. 17 is a schematic illustration of the structure of tracing information (2b-1st edition) of a tracing information management section.

FIG. 18 is a schematic illustration of an example of generation of a bond and PIAT information (2b-2nd edition).

FIG. 19 is a schematic illustration of the structure of tracing information (2a-2nd edition) of a tracing information management section.

FIG. 22 is a schematic illustration of the structure of tracing information (3rd edition) of a tracing information management section.

FIG. 24 is a schematic illustration of the concept of bond properness proof at the time of dividing and renewing a bond.

FIG. 25 is a schematic illustration of the concept of PIAT information verification by the tracing information verification section.

BEST MODE FOR CARRYING OUT THE INVENTION

Figure 1:
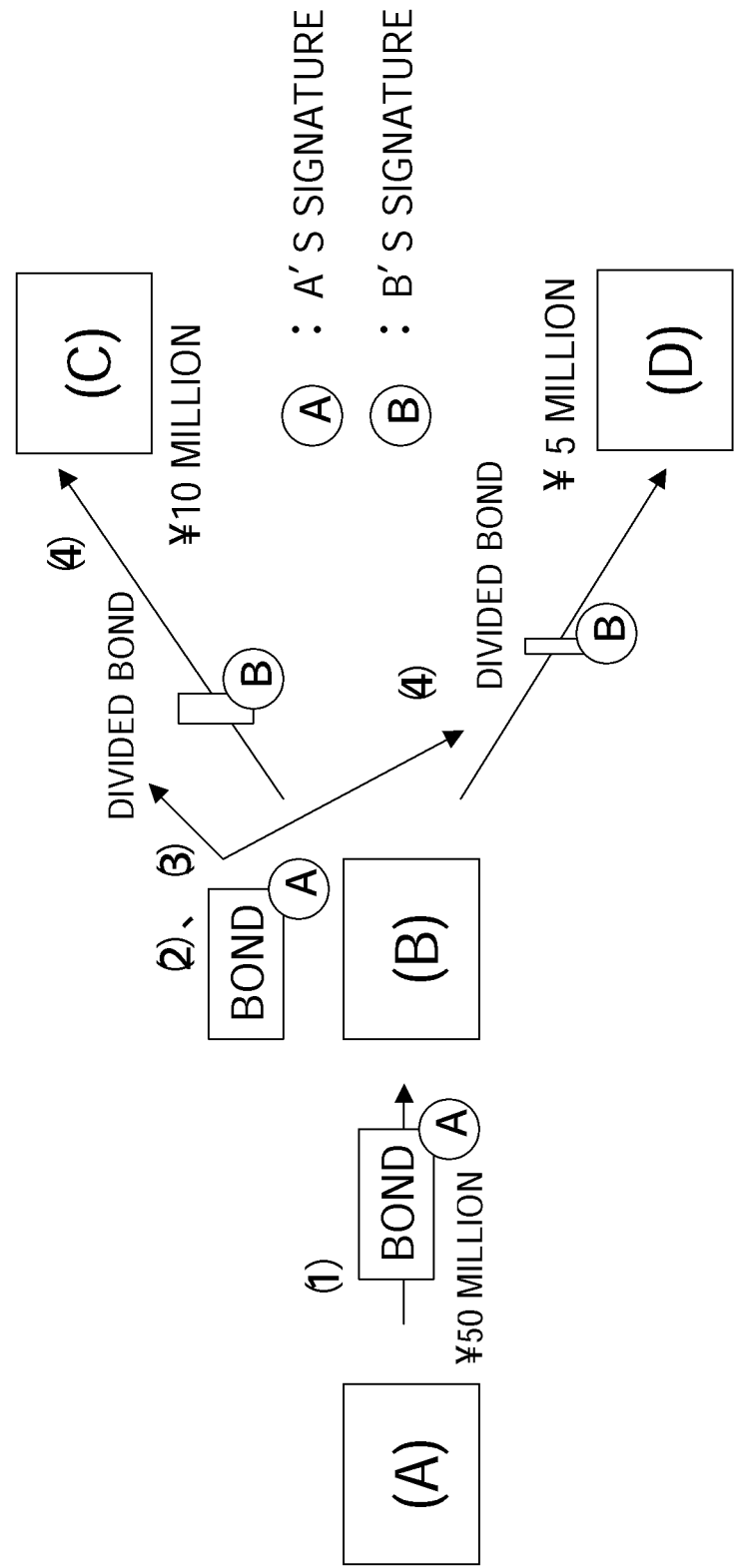
FIG. 1 is a schematic illustration of an example where bond division is realized electronically.
Figure 2:
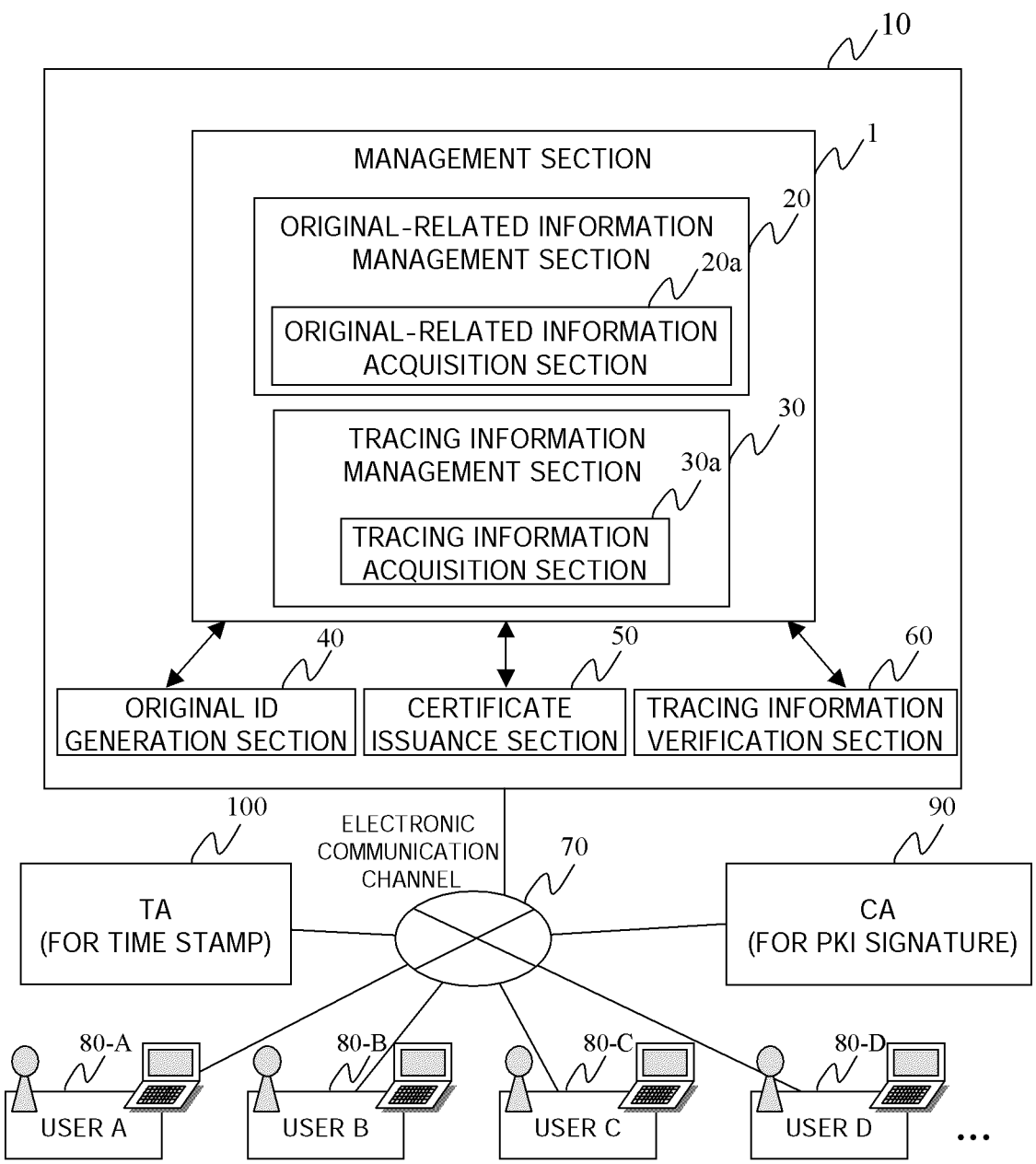
FIG. 2 is a schematic block diagram of an exemplary system according to the present invention, illustrating the principle of the present invention and the system configuration.

Now, an embodiment of the present invention will be described below by referring to FIG. 1 that is a schematic illustration of an example of bond division. FIG. 2 is a schematic block diagram of an electronic bond system according to the present invention (electronic bond management agency, which corresponds to an electronic document management apparatus according to the present invention), illustrating the principle underlying the present invention and the system configuration.

The electronic bond system (electronic document management apparatus) 10 of FIG. 2 has a management section 1, an original ID generation section 40, a certificate issuance section 50 and a tracing information verification section 60. The management section 1 includes an original-related information management section (document information management section according to the present invention) 20 and a tracing information management section 30. The original-related information management section 20 by turn includes an original-related information acquisition section (original-related information acquisition section according to the present invention) 20a for acquiring original-related information (document information) and the tracing information management section 30 includes a tracing information acquisition section 30a for acquiring tracing information.

The original-related information management section 20 acquires, accumulates and manages original-related information (document information) so as to prepare itself for ex-post facto original tracing/third party testimonies. Specific examples of original-related information include partial alternation management information (to be referred to as PIAT information hereinafter) to be recorded and managed. PIAT information is information obtained by dividing electronic information into blocks, computationally determining hash information for each block and combining pieces of hash information.

It is so schemed that the entire text cannot be conjectured from the output partial alteration management information (so-called partially encrypted text) so as to provide an advantage of easy comparison of partial information and that of prevention of leakage. Thus, it is possible to provide an electronic bond management agency with a scheme by which agency can manage an electronic bond, maintain the originality and the traceability of the electronic bond and testify them to the third party, while protecting personal information and privacy, by recording and managing such information, to exploit the advantages. Additionally, such information is managed for each edition (edition management eliminating overwriting) in such a way that partial alternation management information to be verified can be retrieved with ease from a central office when in ex-post facto verification.

The tracing information management section 30 manages tracing information as a whole to facilitate ex-post facto tracing of a bond. For example, tracing information management section 30 holds tracing history information of a bond such as "the original ID, the preparation type, the preparer, the number of edition and the preparation date" and manages such pieces of information, maintaining the sequence of arrangement.

The original ID generation section 40 generates an ID for unequivocally identifying given original-related information.

The certificate issuance section 50 issues a registration certificate certifying that given original-related information is registered in the document management section. This corresponds to authorization information of an electronic bond management agency.

The tracing information verification section 60 receives original-related information accumulated in the document information management section 20 and tracing information accumulated in the tracing information management section 30 as input and verifies the originality and the traceability of a bond.

The configuration and the role of each of the sections of the electronic bond system 10 are described above. Now, the external actors that exist on the periphery of the electronic bond system 10 will be described below.

The electronic communication channel 70 operates as a unit for transmitting and delivering a processing request from any of the actors and bonds. The electronic bond system 10 and all the external actors existing on the periphery thereof are connected to the electronic communication channel 70.

The electronic communication channel 70 corresponds to the communication protocols of networks such as the Internet, intranets, extranets, wide area networks and so on.

Users 80 are actors who use the electronic bond system 10 and access the electronic bond system 10 by way of the electronic communication channel 70. CA 90 is an actor that can be utilized to provide a bond with a digital signature (PKI signature) in order to check the person who prepared the bond and testify that the bond is not falsified. CA is an abbreviation of certificate authority, which is a third party agency, and the credibility and trueness of a bond can be enhanced and it is made possible to provide a rigorous third party testimony by adopting a certificate issued by the agency.

TA 100 is an actor that is utilized to put a timestamp to a bond in order to testify that a bond is not falsified ever since (in order to testify the established time of preparation of the bond) in addition to a PKI signature. TA is an abbreviation of time authority, and the credibility and trueness of a bond can be enhanced and it is made possible to provide a rigorous third party testimony by adopting a certificate issued by the agency like the CA 90.

Figure 3:
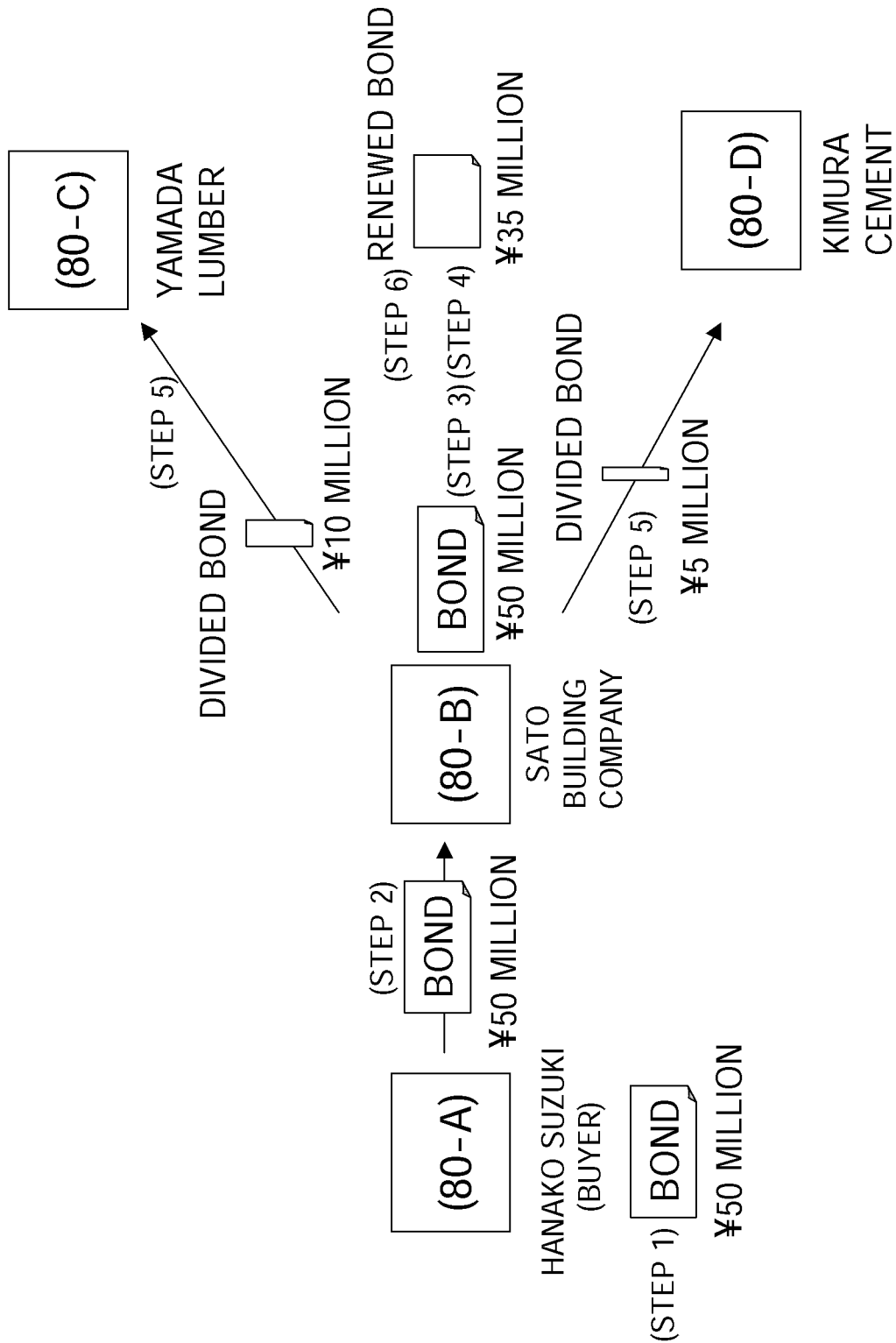
FIG. 3 is a schematic illustration of an electronic bond work flow and a scenario thereof.

Now, how each processing feature of the system having the configuration as shown in FIG. 2 functions will be described below by referring to FIG. 3 and also the conceptual illustration of FIG. 1. Firstly, the work flow and the scenario of an electronic bond will be described. More specifically, this embodiment will be described by way of an electronic promissory note, which is a type of electronic bond.

(Step 1)
For example, assume that Ms Hanako Suzuki 80A decides to buy a house as residence and concludes a contract with Sato Building Company 80B on March 1. According to the contract, the house is to be handed over three months after, or on June 1, and Ms Hanako Suzuki 80A newly issues an electronic promissory note with an amount of ¥50 million due on that day, which is the price of the purchased house.

(Step 2)
Ms Hanako Suzuki 80A transfers the electronic promissory note with an amount due of ¥50 million wholly to Sato Building Company 80B for the price of the house.

(Step 3)
Sato Building Company 80B receives the electronic promissory note of ¥50 million from Ms Hanako Suzuki 80A and starts the work of building the house on March 1.

(Step 4)
The date when the total amount of ¥50 million is due to be paid by Ms Hanako Suzuki 80A is June 1 and Sato Building Company 80B cannot procure necessary building materials from Yamada Lumber 80C and Kimura Cement 80D on the day of starting the building work without using the electronic promissory note. Therefore, Sato Building Company 80B comes to an idea of dividing the electronic promissory note received from Ms Hanako Suzuki 80A and transferring divided notes in order to procure necessary building materials. The divided notes to be transferred bear the following amounts (¥10 million to Yamada Lumber 80C, ¥5 million to Kimura Cement 80D).

(Step 5)
Sato Building Company 80B processes the electronic promissory note received from Ms Hanako Suzuki 80A with the amount due of ¥50 million and issues an electronic promissory note (divided) with an amount due of ¥10 million for the lumber to be procured, which is then transferred to Yamada Lumber 80C. The divided note bears all the descriptions (the issuer's name, the date of issuance, the due date, the place of payment etc.) made by Ms Hanako Suzuki 80A except the amount due of the divided note and the entity to whom the amount due is payable. Likewise, Sato Building Company 80B processes the electronic promissory note received from Ms Hanako Suzuki 80A with the amount due of ¥50 million and issues an electronic promissory note (divided) with an amount due of ¥5 million for the cement to be procured, which is then transferred to Kimura Cement 80D. The divided note bears all the descriptions (the issuer's name, the date of issuance, the due date, the place of payment etc.) made by Ms Hanako Suzuki 80A except the amount due of the divided note and the entity to whom the amount due is payable.

(Step 6)
Thus, since Sato Building Company 80B divides the electronic promissory note with the amount due of ¥50 million received from Ms Hanako Suzuki 80A to produce divided notes with amounts due of ¥10 million for the lumber and ¥5 million for the cement and transfers them respectively to Yamada Lumber 80C and Kimura Cement 80D, the Sato Building Company 80B renews the original electronic promissory note as a note bearing an amount due of ¥35 million, which is the balance. The renewed note bears all the descriptions (the issuer's name, the transferee's name, the date of issuance, the due date, the place of payment etc.) made by Ms Hanako Suzuki 80A except the amount due of the renewed note.

Now, how this system operates will be described on a function by function basis according to the work flow and the scenario of the electronic bond described above.

It is assumed here that user authentication information telling that Ms Hanako Suzuki 80A, Sato Building Company 80B, Yamada Lumber 80C and Kimura Cement 80D can utilize the electronic bond system 10 is registered in advance to meet a prerequisite of the system and the system is adapted to rigorous access control for this scene of utilization of the system. It is also assumed that all the information is handled as electronic information for this scene of utilization of the system.

(New Issuance Sequence)

FIG. 4 is a flowchart of a process of newly issuing an electronic bond. FIG. 5 is a schematic illustration of an example of generation of the contents of a bond (a) and PIAT information of the bond (b) in the process of newly issuing an electronic bond (1st edition). Now, the process of newly issuing a bond will be described below.

(1) Ms Hanako Suzuki 80A receives a form of electronic promissory note (bond) from the electronic bond system 10 and inputs necessary data to related lines as shown in FIG. 5A (Step ST-C1). At this time, an application program that operates for exchanging data between the user (Ms Hanako Suzuki 80A) and the electronic bond system 10 by way of the electronic communication channel 70 is installed in the users terminal (e.g., PC (personal computer)) and the user operates the terminal.

(2) As the input of necessary data is established, a digital signature using the PKI (public key infrastructure) of Ms Hanako Suzuki 80A (to be referred to as PKI signature hereinafter) and a time stamp (to be referred to as TS hereinafter) are put to the bond as shown in FIG. 5(*a*) (Step ST-C2). The credibility and trueness of the information can be enhanced and it is made possible to provide a rigorous third party testimony by adopting a PKI signature issued by a CA (certificate authority: a third party agency) 90 and a time stamp issued by TA (time authority) 100.

(3) The application program installed at the user's side generates PIAT information from the information on the bond (Step ST-C3) as shown in FIG. 5(*b*). While PIAT information is generated by means of the application program installed at the user's side in this instance, the electronic bond system 10 itself or a third party agency having such a function may alternatively generate the PIAT information. As the operation of generating PIAT information is completed, a PKI signature of Ms Hanako Suzuki 80A and a TS are put to the information (Step ST-C4).

(4) According to FIG. 5 and paying attention to the amount due, a character string of "50,000,000" showing the amount of money to be transferred is linked to a random number (the R part in the illustrated instance) "123" and hash information is generated for the character string of "123+50,000,000". FIG. 5 also shows that hash information of "abcde" is output as a result of generation.

A similar generation process is executed for the other lines. A random number is employed in the illustrated instance in order to prevent the contents of the bond from being conjectured on the basis of the generated PIAT information. The role of this invention is to introduce a technique that does not allow an electronic bond management agency to control private information and privacy information (and does not hold the substances of bonds) and provide means for managing electronic bonds, securing the originality and the traceability of a bond and making it possible to testify them to the third party.

Thus, the information that the agency manages is required a more enhanced level of security. From this point of view, PIAT information is an encrypted sentence that prevents the text from being conjectured on the basis of the output information and provides an advantage of easy comparison of partial information and that of prevention of leakage.

However, such a scheme cannot necessarily ensure security. For example, suppose that the amount due of the bond is conjectured from the hash information="abcde" of the part of the amount of money to be transferred, disregarding the random number. Then, it is easy to realize that the hash information represents an amount of money that is to be transferred because it is known that that part represents an amount of money to be transferred. On this assumption, if hash information is generated from an arbitrarily selected amount of money to be transferred and an output of "abcde" is obtained as a result, it is easy to estimate that the amount of money to be transferred is "50,000,000".

To avoid this problem, it is desirable to generate hash information by combining random numbers. While a random number is employed in this instance, a technique other than employing a random number may be used for the same purpose. For example, time information may be used for representing the time of input.

(5) The application program installed at the user's side issues a registration request for a bond to the electronic bond system 10. At this time, the application program transmits the generated PIAT information as bond information and notifies the electronic bond system 10 that the process is a new generation process (Step ST-C5).

(6) The electronic bond system 10 that receives the new generation process request makes sure that it is transmitted from Ms Hanako Suzuki 80A for a bond from the PKI signature of Ms Hanako Suzuki 80A and the TS that are put to the bond (Step ST-C6).

(7) As the effectiveness of the bond is confirmed, the original ID generation section 40 in the electronic bond system 10 generates an ID for unequivocally identifying the bond and puts it to the bond. In this instance, original ID="A0001" is obtained (Step ST-C7).

(8) The electronic bond system 10 registers the bond information in the document information management section 20 with the generated original ID to show a corresponding relationship. As a result, the information can easily be retrieved thereafter (Step ST-C8).

(9) The certificate issuance section 50 in the electronic bond system 10 issues a registration certificate certifying that the bond information is registered and stored and sends it to Ms Hanako Suzuki 80A (Step ST-C9). The registration certificate typically includes information on the original ID, the preparation type, the preparer, the number of edition and the preparation date. Preferably, a PKI signature of the electronic bond system 10 and a TS are put to the information in order to prevent any after-the-fact alteration.

(10) The tracing information management section 30 in the electronic bond system 10 generates and manages tracing information including the original ID, the preparation type, the preparer, the number of edition and the preparation date (Step ST-C10). FIG. 6 is a schematic illustration of the structure of the 1st edition of tracing information. FIG. 6 shows the related entry to the electronic bond system 10.

(11) Ms Hanako Suzuki 80A sends and transfers the whole bond and the registration certificate obtained from the electronic bond system 10 as a pair to Sato Building Company 80B (Step ST-C11).

(Whole Bond Transfer Sequence)

FIG. 7 is a flowchart of a process of wholly transferring a bond. FIG. 8 is a schematic illustration of an example of generation contents (a) of a bond (2nd edition) produced by a whole bond transfer process and PIAT information thereof. Now, the operation for a whole bond transfer process will be described below.

(1) Sato Building Company 80B receives the bond from Ms Hanako Suzuki 80A (Step ST-S1). At this time, an application program that operates for exchanging data between the user (Sato Building Company 80B) and the electronic bond system 10 by way of the electronic communication channel 70 is installed in the user's terminal (e.g., PC) and the user operates the terminal. Received information is the pair of the bond and the registration certificate.

(2) As the bond is completely received, the receiver makes sure that the bond is sent from Ms Hanako Suzuki 80A, seeing the PKI signature of Ms Hanako Suzuki 80A and the TS put to the bond. Subsequently, the receiver makes sure that the bond is authorized by the electronic bond management agency, seeing the PKI signature of the electronic bond system (electronic bond management agency) 10 and the TS put to the registration certificate (Step ST-S2).

(3) When the effectiveness of the bond is confirmed, Sato Building Company 80B checks the contents of the bond and executes a whole bond transfer acceptance process (Step ST-S3) as shown in FIG. 8(*a*). For example, an "acceptance button" may be provided on the display screen of the terminal and the bond may be accepted when the button is clicked.

(4) As the whole bond transfer acceptance process is completed, a PKI signature of Sato Building Company 80B and a TS are put to the bond (Step ST-S4).

(5) The application program installed at the user's side generates PIAT information from the information on the bond (Step ST-S5) as shown in FIG. 8(*b*). As the operation of generating PIAT information is completed, a PKI signature of Sato Building Company 80B and a TS are put to the information (Step ST-S6).

(6) With regard to acceptance of the contents of the whole bond transfer, Sato Building Company 80B may add acceptance information to the bond, telling that the company accepts the contents of the whole bond transfer and renew the bond. On the other hand, FIG. 8 shows an instance where the bond is not altered from the 1st edition in terms of status and information and Sato Building Company 80B receives and accepts the contents of the whole bond transfer. While it may appear that the bond does not need to be renewed as 2nd edition because the information of the bond is not altered, this mode of operation is adopted by taking a situation where the electronic bond management agency wants to manage it and provide an ex-post-facto testimony that Sato Building Company 80B receives the bond from Ms Hanako Suzuki 80A without altering the status into consideration.

(7) The application program installed at the user's side issues a registration request for a bond to the electronic bond system 10. At this time, the application program transmits the pair of the generated PIAT information and the registration certificate received with it at the time of the whole bond transfer as bond information and notifies the electronic bond system 10 that the process is a whole bond transfer process (Step ST-S7).

(8) As the electronic bond system 10 receives the whole bond transfer process request, the electronic bond system 10 makes sure that it is the bond sent from Sato Building Company 80B, seeing the PKI signature of Sato Building Company 80B and the TS put to the bond. Additionally, the electronic bond system 10 checks the registration certificate received with the bond to see that the bond matches the registration certificate (Step ST-S8).

(9) The original ID generation section 40 of the electronic bond system 10 that receives the whole bond transfer process request generates an ID for unequivocally identifying the bond and puts it to the bond. In this example, an original ID="A0002" is obtained (Step ST-S9).

(10) As the effectiveness of the bond is confirmed, the electronic bond system 10 registers the bond information in the document information management section 20 with the generated original ID to show a corresponding relationship (Step ST-S10).

(11) The certificate issuance section 50 in the electronic bond system 10 issues a registration certificate certifying that the bond information is registered and stored and sends it to Sato Building Company 80B (Step ST-S11).

(12) The tracing information management section 30 in the electronic bond system 10 generates and manages tracing information (Step ST-S12). FIG. 9 is a schematic illustration of the structure of tracing information of the 2nd edition. FIG. 9 shows the related entry to the electronic bond system 10.

(Divided Bond Issuance Sequence)

Figure 10:
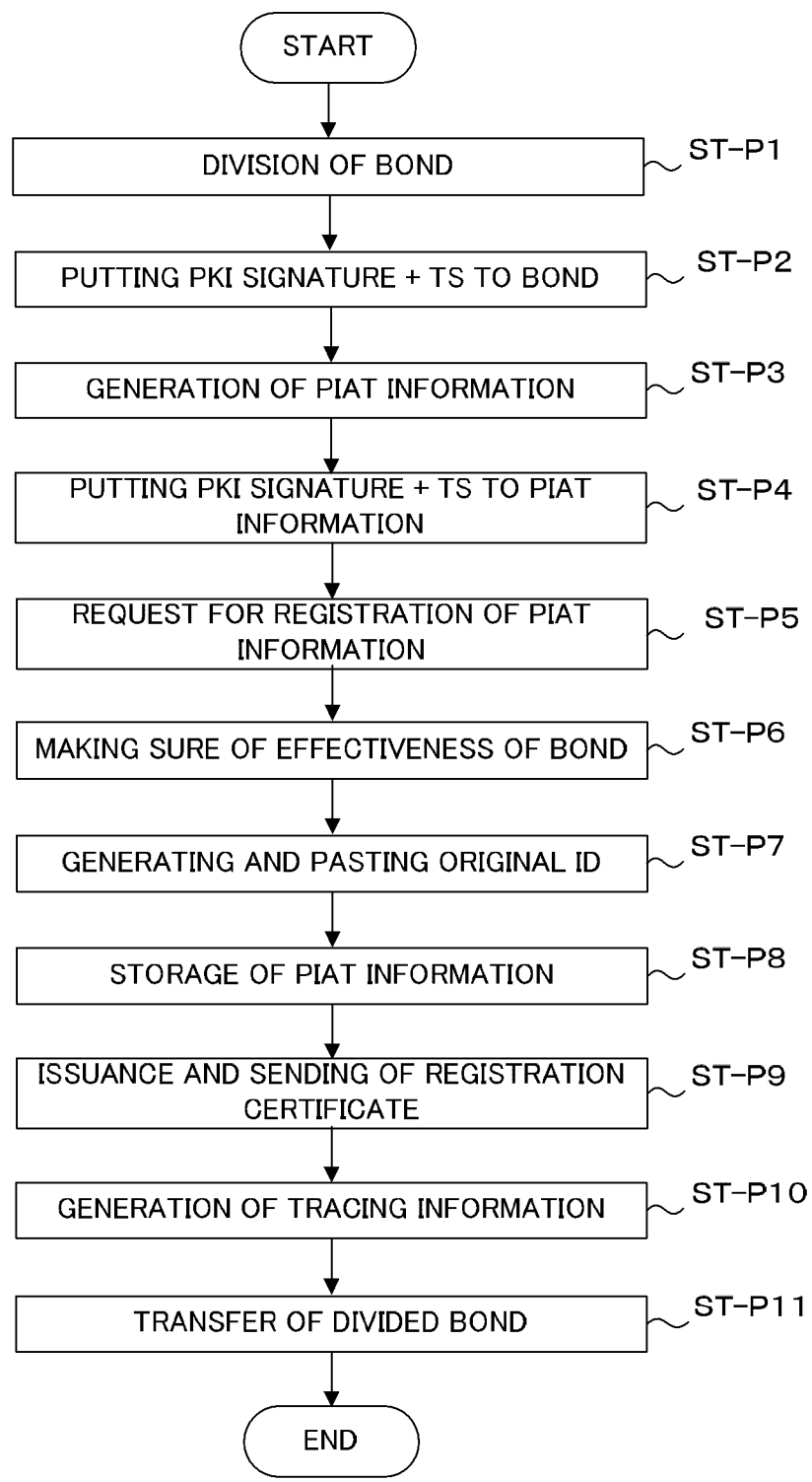
FIG. 10 is a flowchart of a divided bond issuance process.
Figure 11:
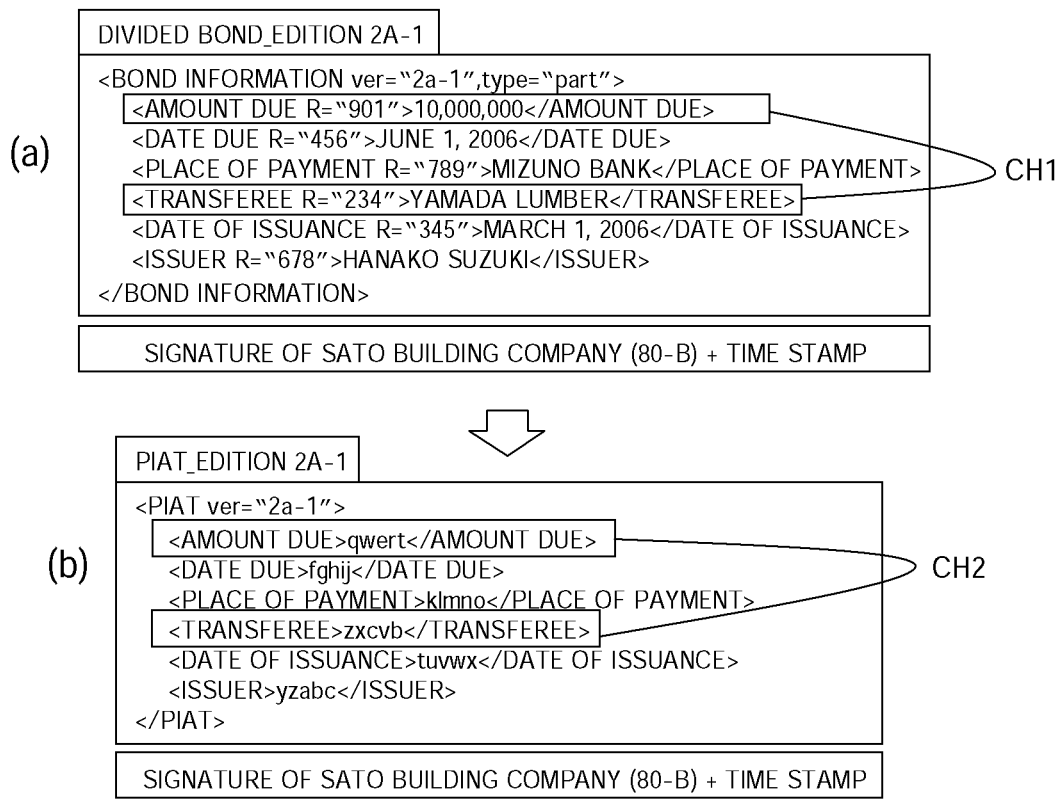
FIG. 11 is a schematic illustration of an example of generation of a bond and PIAT information (2a-1st edition).

FIG. 10 is a flowchart of a divided bond issuance process. FIG. 11 is a schematic illustration of contents of a bond issued as a divided bond (2a-1st edition) (a) and PIAT information (b) thereof. Now, the operation of the divided bond issuance process will be described below.

(1) Sato Building Company 80B executes a bond dividing process as shown in CH1 of FIG. 11(*a*) in order to divide the bond that is wholly transferred from Ms Hanako Suzuki 80A and transfer a divided bond to Yamada Lumber 80C (Step ST-P1).

(2) As the bond dividing process is completed, a PKI signature of Sato Building Company 80B and a TS are put to the divided bond (Step ST-P2).

(3) The application program installed at the user's side generates PIAT information from the information on the bond (Step ST-P3) as shown in CH2 of FIG. 11(*b*). As the operation of generating PIAT information is completed, a PKI signature of Sato Building Company 80B and a TS are put to the information (Step ST-P4). For example, only the amount due of the bond and the transferee are altered in the dividing process.

At this time, a random number different from the random number (R) put to the previous edition (2nd edition) is employed for this edition. More specifically, as for the amount due, the random number of the previous edition (="123") is altered to "901" and the transferred amount is altered from "50,000,000" to "10,000,000". Then, the character strings are linked and hash information is generated for the character string of "901+10,000,000". As a result of generation, hash information "qwert" is output.

As for the transferee, the random number of the previous edition (="012") is altered to "234" while the transferee is altered from "Sato Building Company" to "Yamada Lumber". Then, the character strings are linked and hash information is generated for the character string of "234+Yamada Lumber". As a result of generation, hash information "zxcvb" is output. The part other than the amount due and the transferee should not be altered and hence both the random members and the contents remain unaltered. If the part that should not be altered is intentionally or mistakenly altered, the ex-post-facto illegal alteration can be detected from the generated PIAT information and the scope of responsibility can be clarified from the PKI signature of Sato Building Company 80B and the TS put to the bond.

(4) The application program installed at the user's side issues a registration request for a bond to the electronic bond system 10. At this time, the application program transmits the pair of the generated PIAT information and the registration certificate received with it at the time of the whole bond transfer as bond information and notifies the electronic bond system 10 that the process is a divided bond transfer process (Step ST-P5).

(5) As the electronic bond system 10 receives the divided bond transfer process request, the electronic bond system 10 makes sure that it is the bond sent from Sato Building Company 80B, seeing the PKI signature of Sato Building Company 80B and the TS put to the bond. Additionally, the electronic bond system 10 checks the registration certificate received with the bond to see that the bond from which the divided bond is generated and transferred matches the registration certificate (Step ST-P6).

(6) The original ID generation section 40 of the electronic bond system 10 that receives the divided bond transfer process request generates an ID for unequivocally identifying the bond and puts it to the bond. In this example, an original ID="A5001" is obtained (Step ST-P7).

(7) As the effectiveness of the bond is confirmed, the electronic bond system 10 registers the bond information in the document information management section 20 with the generated original ID to show a corresponding relationship (Step ST-P8).

(8) The certificate issuance section 50 in the electronic bond system 10 issues a registration certificate certifying that the bond information is registered and stored and sends the registration certificate to Sato Building Company 80B (Step ST-P9).

(9) The tracing information management section 30 in the electronic bond system 10 generates and manages tracing information (Step ST-S10). FIG. 12 is a schematic illustration of the structure of tracing information of the 2a-1st edition. FIG. 12 shows the related entry to the electronic bond system 10.

(10) Sato Building Company 80B sends and transfers the divided bond and the registration certificate obtained from the electronic bond system 10 as a pair to Yamada Lumber 80C (Step ST-P11).

(Divided Bond Transfer Sequence)

Figure 13:
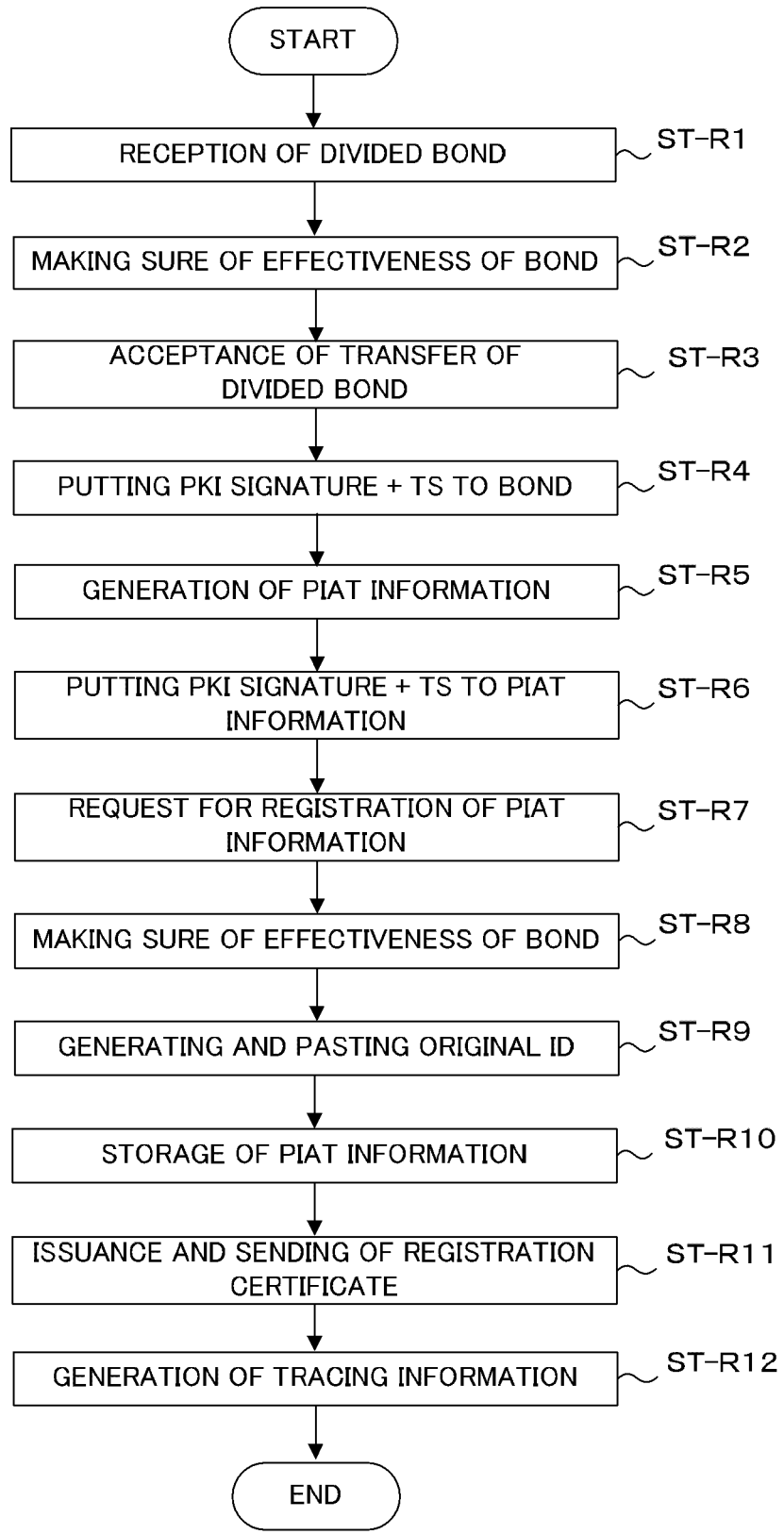
FIG. 13 is a flowchart of a process of issuing a divided bond.

FIG. 13 is a flowchart of a process of issuing a divided bond. FIG. 14 is a schematic illustration of generation of contents (a) of a bond (2a-2nd edition) produced by way of a divided bond issuing process and PIAT information (b) thereof. Now, the operation for a divided bond transfer process will be described below.

(1) Yamada Lumber 80C receives the divided bond from Sato Building Company 80B (Step ST-R1). At this time, an application program that operates for exchanging data between the user (Yamada Lumber 80C) and the electronic bond system 10 by way of the electronic communication channel 70 is installed in the user's terminal (e.g., PC) and the user operates the terminal. Received information is the pair of the divided bond and the registration certificate.

(2) As the divided bond is completely received, the receiver makes sure that the divided bond is sent from Sato Building Company 80B, seeing the PKI signature of Sato Building Company 80B and the TS put to the divided bond. Subsequently, the receiver makes sure that the divided bond is authorized by the electronic bond management agency, seeing the PKI signature of the electronic bond system (electronic bond management agency) 10 and the TS put to the registration certificate (Step ST-R2).

(3) When the effectiveness of the bond is confirmed, Yamada Lumber 80C checks the contents of the bond and executes a divided bond transfer acceptance process (Step ST-R3) as shown in FIG. 14(*a*).

(4) As the divided bond transfer acceptance process is completed, a PKI signature of Yamada Lumber 80C and a TS are put to the bond (Step ST-R4).

(5) The application program installed at the user's side generates PIAT information from the information on the bond (Step ST-R5) as shown in FIG. 14(*b*). As the operation of generating PIAT information is completed, a PKI signature of Yamada Lumber 80C and a TS are put to the information (Step ST-R6).

(6) The application program installed at the user's side issues a registration request for a bond to the electronic bond system 10. At this time, the application program transmits the pair of the generated PIAT information and the registration certificate received with it at the time of the divided bond transfer as bond information and notifies the electronic bond system 10 that the process is a divided bond transfer process (Step ST-R7).

(7) As the electronic bond system 10 receives the divided bond transfer process request, the electronic bond system 10 makes sure that it is the bond sent from Yamada Lumber 80C, seeing the PKI signature of Yamada Lumber 80C and the TS put to the bond. Additionally, the electronic bond system 10 checks the registration certificate received with the bond to see that the bond from which the divided bond is generated and transferred matches the registration certificate (Step ST-R8).

(8) The original ID generation section 40 of the electronic bond system 10 that receives the divided bond transfer process request generates an ID for unequivocally identifying the bond and puts it to the bond. In this example, an original ID="A9001" is obtained (Step ST-R9).

(9) As the effectiveness of the bond is confirmed, the electronic bond system 10 registers the bond information in the document information management section 20 with the generated original ID to show a corresponding relationship (Step ST-R10).

(10) The certificate issuance section 50 in the electronic bond system 10 issues a registration certificate certifying that the bond information is registered and stored and sends it to Yamada Lumber 80C (Step ST-R11).

(11) The tracing information management section 30 in the electronic bond system 10 generates and manages tracing information (Step ST-R12). FIG. 15 is a schematic illustration of the structure of tracing information of the 2a-2nd edition. FIG. 15 shows the related entry to the electronic bond system 10.

(Divided Bond Issuance Sequence)

Figure 16:
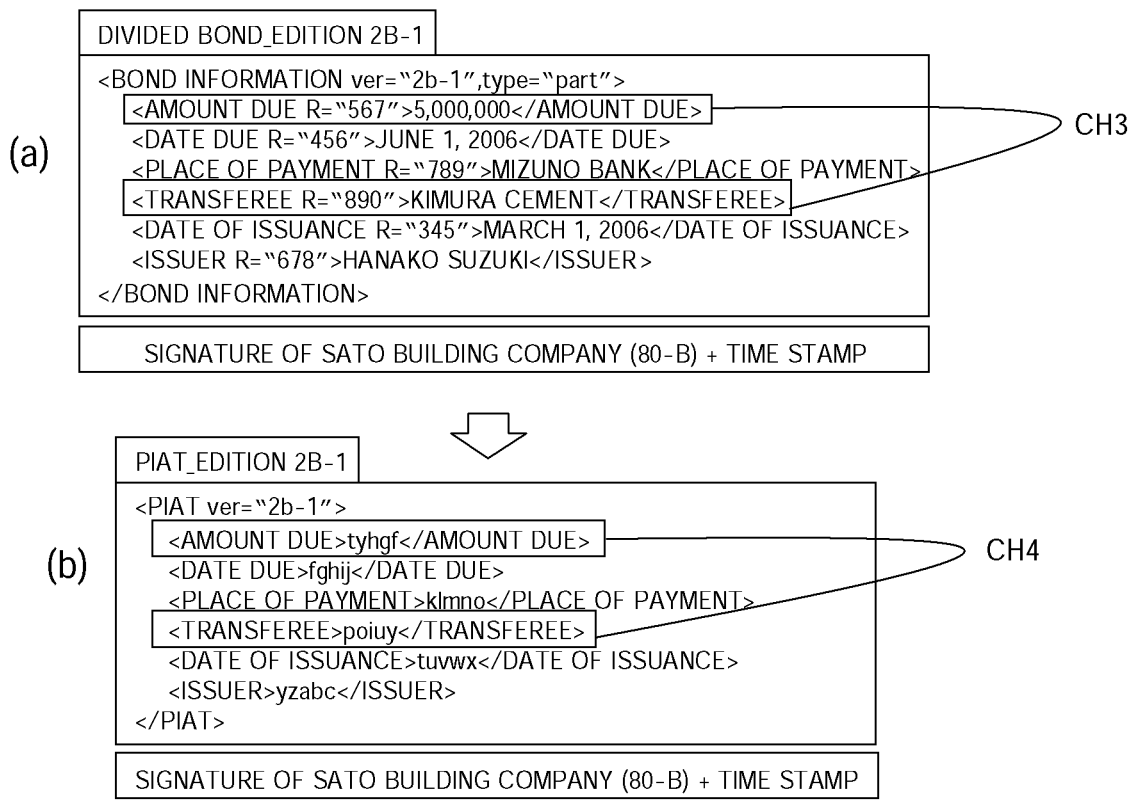
FIG. 16 is a schematic illustration of an example of generation of a bond and PIAT information (2b-1st edition).

The flowchart of the divided bond issuance process is same as the one described above by referring to FIG. 10 and hence will not be shown here. FIG. 16 is a schematic illustration of generation of contents (a) of a bond (2b-1st edition) produced by way of a divided bond issuing process and PIAT information (b) thereof. Now, the operation of the divided bond issuance process will be described below.

(1) Sato Building Company 80B executes a bond dividing process as shown in CH3 of FIG. 16(*a*) in order to divide the bond that is wholly transferred from Ms Hanako Suzuki 80A and transfer a divided bond to Kimura Cement 80D (Step ST-P1).

(2) As the bond dividing process is completed, a PKI signature of Sato Building Company 80B and a TS are put to the divided bond (Step ST-P2).

(3) The application program installed at the user's side generates PIAT information from the information on the bond (Step ST-P3) as shown in CH4 of FIG. 16(b). As the operation of generating PIAT information is completed, a PKI signature of Sato Building Company 80B and a TS are put to the information (Step ST-P4).

For example, only the amount due of the bond and the transferee are altered in the dividing process as in the case of the 2a-1st edition. At this time, a random number different from the random number (R) put to the previous edition (2nd edition) is employed for this edition. More specifically, as for the amount due, the random number of the previous edition (="123") is altered to "567" and the transferred amount is altered from "50,000,000" to "5,000,000". Then, the character strings are linked and hash information is generated for the character string of "567+5,000,000".

As a result of generation, hash information "tyhgf" is output. As for the transferee, the random number of the previous edition (="012") is altered to "890" while and the transferee is altered from "Sato Building Company" to "Kimura Cement". Then, the character strings are linked and hash information is generated for the character string of "890+Kimura Cement".

As a result of generation, hash information "poiuy" is output. The part other than the amount due and the transferee should not be altered and hence both the random members and the contents remain unaltered. If the part that should not be altered is intentionally or mistakenly altered, the ex-post-facto illegal alteration can be detected from the generated PIAT information and the scope of responsibility can be clarified from the PKI signature of Sato Building Company 80B and the TS put to the bond.

(4) The application program installed at the user's side issues a registration request for a bond to the electronic bond system 10. At this time, the application program transmits the pair of the generated PIAT information and the registration certificate received with it at the time of the whole bond transfer as bond information and notifies the electronic bond system 10 that the process is a divided bond transfer process (Step ST-P5).

(5) As the electronic bond system 10 receives the divided bond transfer process request, the electronic bond system 10 makes sure that it is the bond sent from Sato Building Company 80B, seeing the PKI signature of Sato Building Company 80B and the TS put to the bond. Additionally, the electronic bond system 10 checks the registration certificate received with the bond to see that the bond from which the divided bond is generated and transferred matches the registration certificate (Step ST-P6).

(6) The original ID generation section 40 of the electronic bond system 10 that receives the divided bond transfer process request generates an ID for unequivocally identifying the bond and puts it to the bond. In this example, an original ID="A5002" is obtained (Step ST-P7).

(7) As the effectiveness of the bond is confirmed, the electronic bond system 10 registers the bond information in the document information management section 20 with the generated original ID to show a corresponding relationship (Step ST-P8).

(8) The certificate issuance section 50 in the electronic bond system 10 issues a registration certificate certifying that the bond information is registered and stored and sends it to Sato Building Company 80B (Step ST-P9).

(9) The tracing information management section 30 in the electronic bond system 10 generates and manages tracing information (Step ST-S10). FIG. 17 is a schematic illustration of the structure of tracing information of the 2b-1st edition. FIG. 17 shows the related entry to the electronic bond system 10.

(10) Sato Building Company 80B sends and transfers the divided bond and the registration certificate obtained from the electronic bond system 10 as a pair to Kimura Cement 80D (Step ST-P11).

(Divided Bond Transfer Sequence)

Now, the operation of the divided bond transfer process will be described below. The flowchart of the divided bond transfer process is same as the one described above by referring to FIG. 13 and hence will not be shown here. FIG. 18 is a schematic illustration of an example of the contents a bond transferred as a divided bond (2b-2nd edition) (a) and PIAT information (b) thereof. The operation of the divided bond transfer process is as follows.

(1) Kimura Cement 80D receives the divided bond from Sato Building Company 80B (Step ST-R1). At this time, an application program that operates for exchanging data between the user (Kimura Cement 80D) and the electronic bond system 10 by way of the electronic communication channel 70 is installed in the user's terminal (e.g., PC) and the user operates the terminal. Received information is the pair of the divided bond and the registration certificate.

(2) As the divided bond is completely received, the receiver makes sure that the divided bond is sent from Sato Building Company 80B, seeing the PKI signature of Sato Building Company 80B and the TS put to the bond. Subsequently, the receiver makes sure that the divided bond is authorized by the electronic bond management agency, seeing the PKI signature of the electronic bond system (electronic bond management agency) 10 and the TS put to the registration certificate (Step ST-R2).

(3) When the effectiveness of the bond is confirmed, Kimura Cement 80D checks the contents of the bond and executes a divided bond transfer acceptance process (Step ST-R3) as shown in FIG. 18(a).

(4) As the divided bond transfer acceptance process is completed, a PKI signature of Kimura Cement 80D and a TS are put to the bond (Step ST-R4).

(5) The application program installed at the user's side generates PIAT information from the information on the bond (Step ST-R5) as shown in FIG. 18(b). As the operation of generating PIAT information is completed, a PKI signature of Kimura Cement 80D and a TS are put to the information (Step ST-R6).

(6) The application program installed at the user's side issues a registration request for a bond to the electronic bond system 10. At this time, the application program transmits the pair of the generated PIAT information and the registration certificate received with it at the time of the divided bond transfer as bond information and notifies the electronic bond system 10 that the process is a divided bond transfer process (Step ST-R7).

(7) As the electronic bond system 10 receives the divided bond transfer process request, the electronic bond system 10 makes sure that it is the bond sent from Kimura Cement 80D, seeing the PKI signature of Kimura Cement 80D and the TS put to the bond. Additionally, the electronic bond system 10 checks the registration certificate received with the bond to see that the bond from which the divided bond is generated and transferred matches the registration certificate (Step ST-R8).

(8) The original ID generation section 40 of the electronic bond system 10 that receives the divided bond transfer process request generates an ID for unequivocally identifying the bond and puts it to the bond. In this example, an original ID="A9002" is obtained (Step ST-R9).

(9) As the effectiveness of the bond is confirmed, the electronic bond system 10 registers the bond information in the document information management section 20 with the generated original ID to show a corresponding relationship (Step ST-R10).

(10) The certificate issuance section 50 in the electronic bond system 10 issues a registration certificate certifying that the bond information is registered and stored and sends it to Kimura Cement 80D (Step ST-R11).

(11) The tracing information management section 30 in the electronic bond system 10 generates and manages tracing information (Step ST-R12). FIG. 19 is a schematic illustration of the structure of tracing information of the 2a-2nd edition. FIG. 19 shows the related entry to the electronic bond system 10.

(Renewal Sequence)

Figure 20:
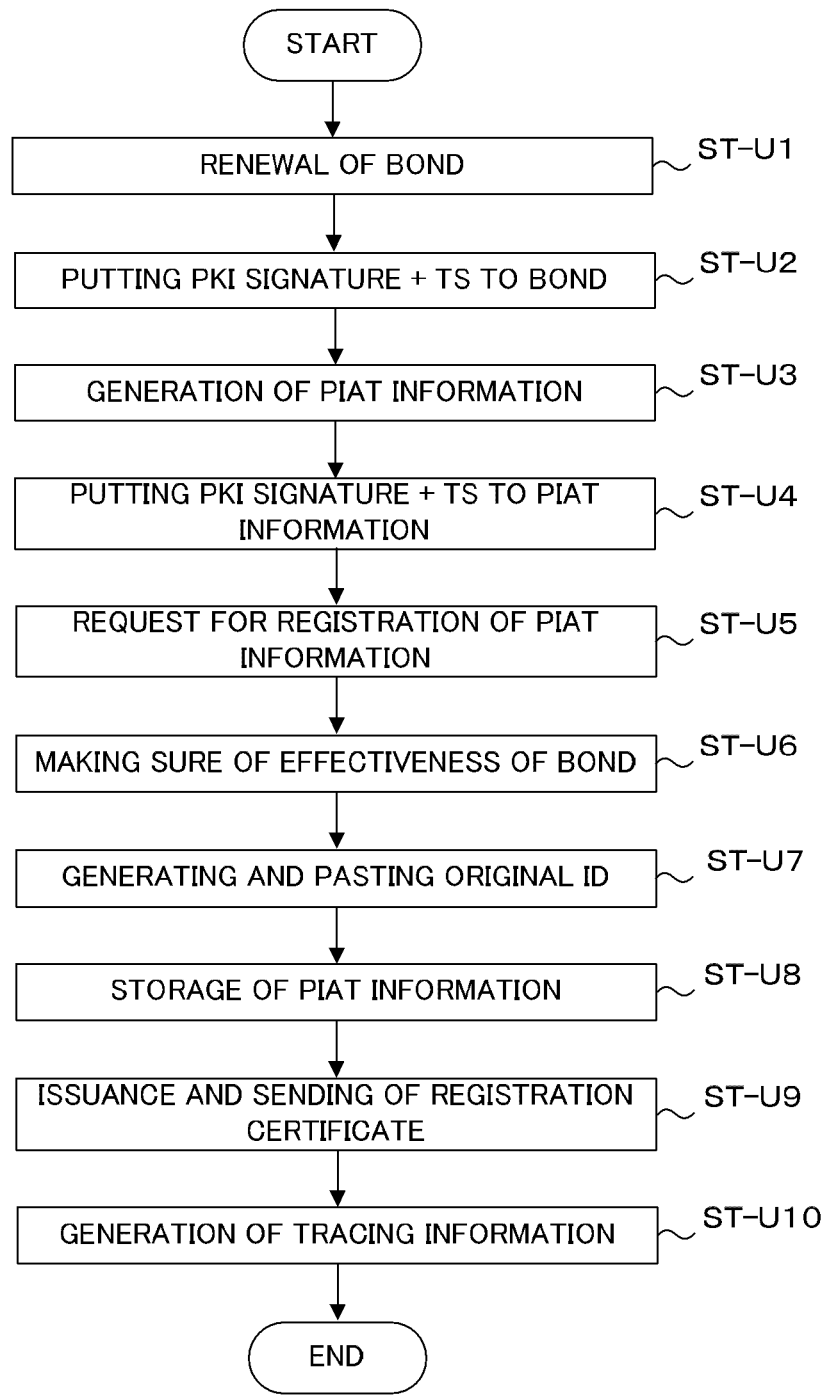
FIG. 20 is a flowchart of a renewal process.
Figure 21:
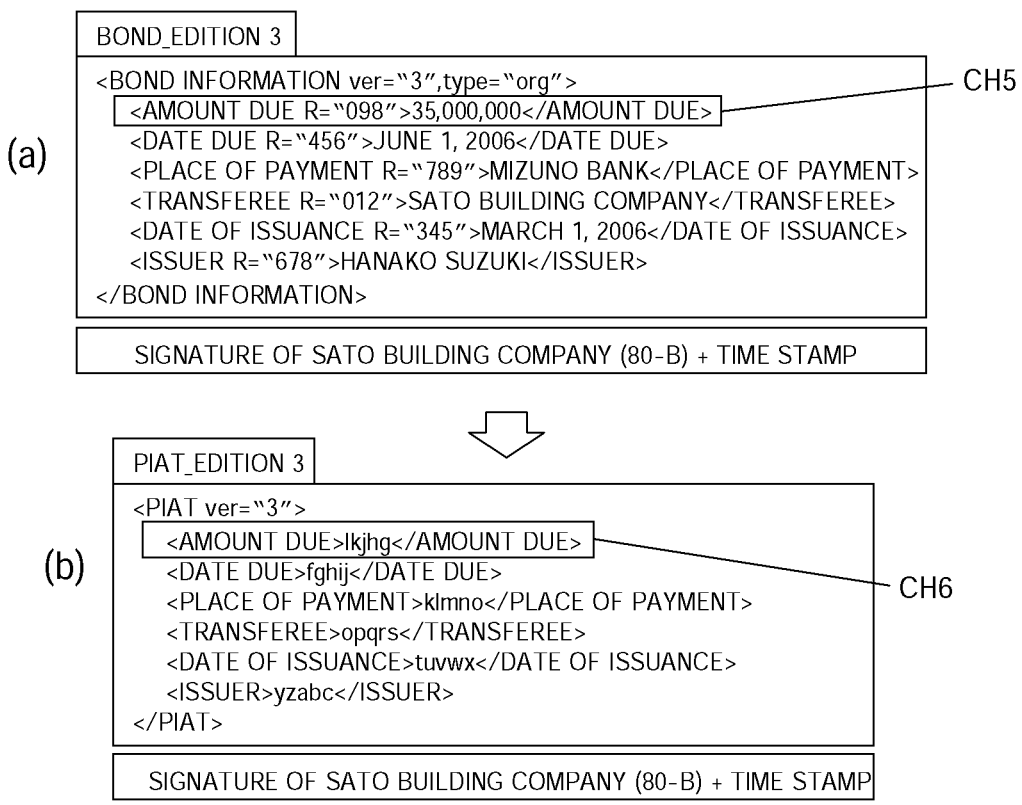
FIG. 21 is a schematic illustration of an example of generation of a bond and PIAT information (3rd edition).

FIG. 20 is a flowchart of a renewal process. FIG. 21 is a schematic illustration of an example of generation of contents (a) of a bond (3rd edition) produced by way of a bond renewal process and PIAT information (b) thereof. Now, the operation of the bond renewal process will be described below.

(1) Sato Building Company 80B executes a renewal process to produce a new bond as shown in CH5 of FIG. 21(*a*) from the bond wholly transferred from Ms Hanako Suzuki 80A to reflect the divided bond transfer processes executed to transfer the divided bonds to Yamada Lumber 80C and Kimura Cement 80D (Step ST-U1).

(2) As the bond renewal process is completed, a PKI signature of Sato Building Company 80B and a TS are put to the renewal bond information (Step ST-U2).

(3) The application program installed at the user's side generates PIAT information from the information on the bond (Step ST-U3) as shown in CH6 of FIG. 21(*b*). As the operation of generating PIAT information is completed, a PKI signature of Sato Building Company 80B and a TS are put to the information (Step ST-U4).

As shown in FIG. 21, only the amount due of the bond is altered in this instance. At this time, a random number different from the random number (R) put to the previous edition (2nd edition) is employed for this edition. More specifically, as for the amount due, the random number of the previous edition (="123") is altered to "098" and the transferred amount is altered from "50,000,000" to "35,000,000". Then, the character strings are linked and hash information is generated for the character string of "098+35,000,000".

As a result of generation, hash information "lkjhg" is output. The part other than the amount due should not be altered and hence both the random members and the contents remain unaltered. If the part that should not be altered is intentionally or mistakenly altered, the ex-post-facto illegal alteration can be detected from the generated PIAT information and the scope of responsibility can be clarified from the PKI signature of Sato Building Company 80B and the TS put to the bond.

(4) The application program installed at the user's side issues a registration request for a bond to the electronic bond system 10. At this time, the application program transmits the pair of the generated PIAT information and the registration certificate received with it at the time of the whole bond transfer as a pair and notifies the electronic bond system 10 that the process is a renewal process (Step ST-U5).

(5) As the electronic bond system 10 receives the renewal process request, the electronic bond system 10 makes sure that it is the bond sent from Sato Building Company 80B, seeing the PKI signature of Sato Building Company 80B and the TS put to the bond. Additionally, the electronic bond system 10 checks the registration certificate received with the bond to see that the bond that is renewed matches the registration certificate (Step ST-U6).

(6) The original ID generation section 40 of the electronic bond system 10 that receives the renewal process request generates an ID for unequivocally identifying the bond and puts it to the bond. In this example, an original ID="A0003" is obtained (Step ST-U7).

(7) As the effectiveness of the bond is confirmed, the electronic bond system 10 registers the bond information in the document information management section 20 with the generated original ID to show a corresponding relationship (Step ST-U8).

(8) The certificate issuance section 50 in the electronic bond system 10 issues a registration certificate certifying that the bond information is registered and stored and sends it to Sato Building Company 80B (Step ST-U9).

(9) The tracing information management section 30 in the electronic bond system 10 generates and manages tracing information (Step ST-U10). FIG. 22 is a schematic illustration of the structure of tracing information of the 3rd edition. FIG. 22 shows the related entry to the electronic bond system 10.

Figure 23:
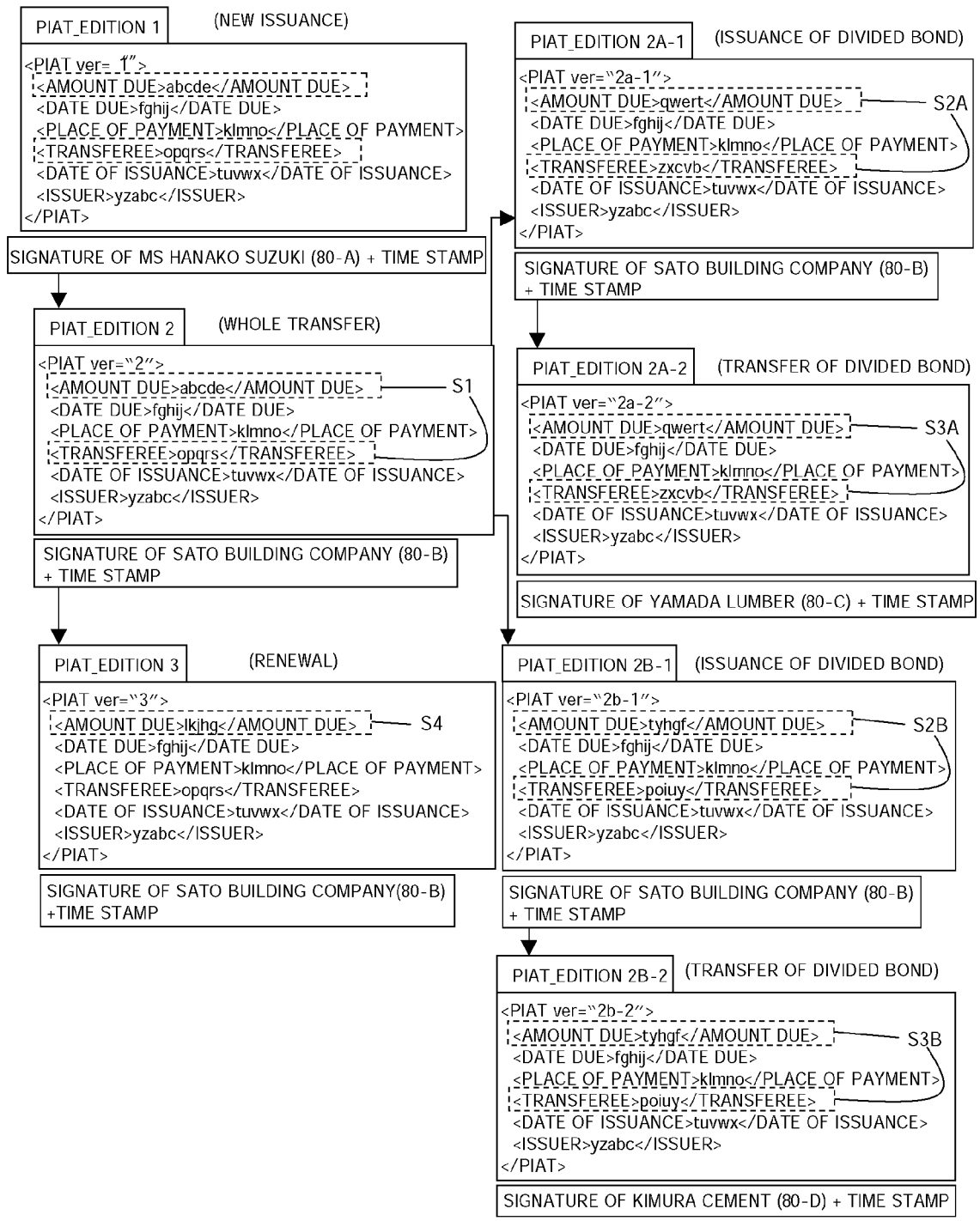
FIG. 23 is a schematic illustration of the state of bond management of the document information management section.

FIG. 23 shows how the bond (PIAT information) accumulated in the document information management section 20 is managed in the above-described procedures. As seen from FIG. 23, it is possible to testify ex post facto that Sato Building Company 80B wholly receives the bond newly issued by Ms Hanako Suzuki 80A in the whole transfer process (1st edition to 2nd edition), that it accepts the whole transfer (part S1 in FIG. 23) and alters the amount due and the transferee but does not alter all the other parts including the due date, the place of payment, the date of issuance and the issuer (parts S2A and S2B in FIG. 23).

It is also possible to testify ex post facto that the altered parts (the amount due and the transferee) are actually altered "when (from TS) by whom (Sato Building Company 80B) and on what (2nd edition) by use of the PKI signature and time stamp to the PIAT information. In addition to the above tracing, it is also possible to testify ex post facto that "what parts (the amount due and the transferee) are altered by whom (Sato Building Company 80B)" from the PIAT information to which a PKI signature is put.

Furthermore, it is possibly to testify ex post fact "how (the original bond is divided and divided bonds are transferred)" from the tracing information of the tracing information management section 30 and also that the divided bonds produced by dividing the original bond and issued by Sato Building Company 80B are received straight and the transfers of the divided bonds are accepted by Yamada Lumber 80C and Kimura Cement 80D (parts S3A and S3B in FIG. 23) at the time of transferring divided bonds (from the 2a-1st edition to the 2a-2nd edition, from the 2b-1st edition to the 2b-2nd edition) and that only the amount due is altered and the due date, the place of payment, the transferees, the date of issuance and the issuer are not altered (part S4 in FIG. 23) at the time of renewal (from the 2nd edition to the 3rd edition).

The essential part of the flow from the issuance of a novel bond to the division and the renewal of the bond is described above. Now, the scheme by means of which the transferees of the divided bonds, Yamada Lumber 80C and Kimura Cement 80D, can make sure that the bonds they receive are true ones and free from any problem.

With the above description, it will be clear that the current entirety can be testified by managing the editions by means of PKI signatures. However, there is nothing to make sure that the original bond is properly divided and renewed. More specifically, the amounts due of the divided and transferred bonds are disclosed but there should be a scheme by means of which it is possible to find out the amount due of the original bond and that the original bond is properly divided. In the following, the scheme by means of which a transferee of a divided bond can make sure that the bond is a true one and free from any problem, in other words, that the amount due of the divided bond takes a right part of the amount due of the original bond and that it is possible to verify that the originality of the bond information is maintained and the effects of the scheme will be described. FIG. 24 is a conceptual illustration of the scheme.

Firstly, when Sato Building Company 80B divides the original bond and transfers a divided bond to Yamada Lumber 80C, an entry is added to tell that an amount of ¥10 million is transferred to Yamada Lumber 80C out of the total amount due of ¥50 million (part AP1 in FIG. 24). As a result, it is possible to testify that the bond issued by Ms Hanako Suzuki 80A is divided by Sato Building Company 80B to produce a divided bond of ¥10 million, which is then transferred to Yamada Lumber 80C so that Yamada Lumber 80C is entitled to receive ¥10 million, which is a right part of the amount due of the original bond (¥10 million out of ¥50 million) and that the other parts (the parts that should not be altered) are authorized by Ms Hanako Suzuki 80A and not illegally altered by Sato Building Company 80B.

Additionally, when Sato Building Company 80B transfers a divided bond to Kimura Cement 80D, an entry is added to tell that an amount of ¥5 million is transferred to Kimura Cement 80D and the entry describing that an amount of ¥10 million is transferred to Yamada Lumber 80C at the time of dividing the original bond remains (part AP2 in FIG. 24). As a result, it is possible to testify that the bond issued by Ms Hanako Suzuki 80A is divided by Sato Building Company 80B to produce a divided bond of ¥10 million, which is then transferred to Yamada Lumber 80C and a divided bond of ¥5 million, which Kimura Cement 80D is entitled to receive, and which is a right part of the amount due of the original bond (¥5 million out of ¥50 million less ¥10 million or ¥40 million) and that the other parts (the parts that should not be altered) are authorized by Ms Hanako Suzuki 80A and not illegally altered by Sato Building Company 80B.

Furthermore, when Sato Building Company 80B renews the original bond after transferring the divided bonds to Yamada Lumber 80C and Kimura Cement 80D, an entry is added to tell that the renewed bond bears an amount due of ¥35 million and the additional entries describing that amounts of ¥10 million and ¥5 million are transferred remain. As a result, it is possible to testify that the original bond issued by Ms Hanako Suzuki 80A is divided by Sato Building Company 80B to produce a divided bond of ¥10 million, which is then transferred to Yamada Lumber 80C, and a divided bond of ¥5 million, which is then transferred to Kimura Cement 80D, that the original bond is renewed to bear the amount of ¥35 million, which is a right part of the amount due of the original bond (¥35 million equal to ¥50 million less ¥10 million, or ¥40 million, less ¥5 million) and that the other parts (the parts that should not be altered) are authorized by Ms Hanako Suzuki 80A and not illegally altered by Sato Building Company 80B.

The PIAT information produced at each time of division and each time of transfer is wholly managed by the electronic bond system (electronic bond management agency) 10 and the tracing information verification section 60 of the electronic bond system 10 functions to verify the above facts.

FIG. 25 is a conceptual illustration of the function of verifying the facts in a manner as described below. In FIG. 25, VR1, VR5 and VR6 verify that the amount due of the bond newly issued by Ms Hanako Suzuki 80A, the issuer and the place of payment are not altered illegally in the course of the subsequent divisions and renewal and VR2 and VR3 verify that the amounts due of the divided bonds are not altered since the time when Sato Building Company 80B divides the original bond and authorizes the division, while VR4 verifies that Sato Building Company 80B renewed the original bond after dividing it and authorized the division. The PIAT information wholly managed by the electronic bond system (electronic bond management agency) 10 may be disclosed to and testified by a third party agency specializing in verification.

Because a scheme that does not allow the third party to conjecture the contents of the text if the PIAT information is disclosed to the third party (and provides an advantage of easy comparison of partial information and that of prevention of leakage) is introduced, such a system can be realized and operated with ease.

With the above-described embodiment, it is possible to divide an electronic document that cannot be divided by any conventional techniques and a simple combination thereof and testify the originality and the traceability of the electronic bond that is divided and circulated to a plurality of entities. Then, it is easily possible to testify the properness of the division to the third party. More specifically, the embodiment provides a scheme by means of which a transferee of a divided bond can verify the trueness of the divided bond with ease and securely receive the bond and a scheme by means of which it is possible to trace a bond and prove the route of circulation thereof. The former scheme is adapted to support an attempt of finding the original bond of a divided bond as well as "the amount due of the original bond, how it is divided and the amounts due of the divided bonds" and to check the bond is properly divided and renewed and the latter scheme provides a technique that does not allow an electronic bond management agency to control private information and privacy information (and does not hold the substances of bonds) and support operations of managing electronic bonds, securing the originality and the traceability of a bond and making it possible to testify them to the third party.

The steps illustrated in each of the flowcharts of the above-described embodiment can be stored in a computer readable recording medium as an electronic document management program to make the computer possible to execute the electronic document management method. Computer readable recording mediums that can be used for the purpose of the present invention include portable recording mediums such as CD-ROMs, flexible disks, DVDs, magneto-optic disks and IC cards, databases for holding computer programs, other computers and their databases and transmission mediums on transmission lines.

INDUSTRIAL APPLICABILITY

Thus, the present invention provides an advantage of testifying the originality and the traceability of an electronic document and proving the properness thereof to a third party when the electronic bond is divided and made to circulate through a plurality of entities.

The invention claimed is:
1. A non-transitory computer-readable medium having recorded thereon an electronic document management program that causes a computer to manage document informa- tion relating to an electronic bond generated from electronic information, the program causing the computer to perform a process comprising:

acquiring a plurality of pieces of part identification information respectively identifiably expressing a plurality of parts of document information and a digital signature corresponding to the document information;

acquiring a preparation type, a preparer's name and a time and date of preparation of the document information as tracing information of the document information, the preparation type indicating at least one of new issuance of an electronic bond, transfer of a whole electronic bond, issuance of divided electronic bonds, and transfer of one or more than one divided electronic bonds;

managing the part identification information and the digital signature acquired in acquiring the plurality of pieces of part identification information and the digital signature and the tracing information acquired in acquiring the preparation type, the preparer's name and the time and date of preparation of the document information, in association with each other, managing, when the preparation type indicates the issuance of divided electronic bonds, the part identification information identifiably expressing amounts of the divided electronic bonds and attached with an electronic signature of the preparer's name of the issuance of the divided electronic bonds; and presenting information relating to the tracing information to the user in response to a request from the user, and causing the acquiring of the plurality of pieces of part identification information and the digital signature and acquiring of the preparation type, the preparer's name and the time and date of preparation of the document information to be executed in response to a directive from the user, wherein the part identification information acquired in acquiring the plurality of pieces of part identification information is acquired as hash information generated by using the parts of the document information, and the hash information is generated by adding the time information to the information of each of the parts of the document information.

2. The non-transitory computer-readable medium according to claim 1, wherein the process further comprises presenting the tracing information in a predetermined format to the user and supporting the verification by the user of the properness of the document information.

3. The non-transitory computer-readable medium according to claim 1, wherein the part identification information is recorded at an electronic bond management agency.

4. The non-transitory computer-readable medium according to claim 3, wherein the amounts of the divided electronic bonds is represented by a random number.

5. The non-transitory computer-readable medium according to claim 3, wherein the amounts of the divided electronic bonds is represented by time information.

6. An electronic document management method for managing document information relating to an electronic bond generated from electronic information and registered by a computer including a processor, the method comprising:

acquiring, using the processor, a plurality of pieces of part identification information respectively identifiably expressing a plurality of parts of document information and a digital signature corresponding to the document information;

acquiring, using the processor, a preparation type, a preparer's name and a time and date of preparation of the document information as tracing information of the document information, the preparation type indicating at least one of new issuance of an electronic bond, transfer of a whole electronic bond, issuance of divided electronic bonds, and transfer of one or more than one divided electronic bonds;

managing the part identification information and the digital signature acquired in acquiring the plurality of pieces of part identification information and the digital signature and the tracing information acquired in acquiring the preparation type, the preparer's name and the time and date of preparation of the document information, in association with each other, managing, when the preparation type indicates the issuance of divided electronic bonds, the part identification information identifiably expressing amounts of the divided electronic bonds and attached with an electronic signature of the preparer's name of the issuance of divided electronic bonds; and presenting information relating to the tracing information to the user in response to a request from the user, and causing the acquiring of the plurality of pieces of part identification information and the digital signature and acquiring of the preparation type, the preparer's name and the time and date of preparation of the document information to be executed in response to a directive from the user:, wherein the acquiring the plurality of pieces of part identification information divides the document information into a plurality of parts, generates a piece of hash information according to the information of each part and acquires the generated plurality of pieces of hash information as the part identification information, and the hash information is generated by adding the time information to the information of each of the parts of the document information.

7. The electronic document management method according to claim 6, further comprising:

presenting the tracing information in a predetermined format to the user and supporting the verification by the user of the properness of the document information.

8. The electronic document management method according to claim 6, wherein the acquiring of pieces of part identification information acquires the part identification information and the digital signature by transmitting a predetermined electronic form prepared by using electronic data from an electronic document management apparatus to a user terminal in response to a request from the user and receiving the data on the predetermined lines input from the user terminal, using the predetermined electronic form.

9. The electronic document management method according to claim 8, wherein the part identification information and the digital signature are transformed into hash information by the user terminal and transmitted to the electronic document management apparatus from the user terminal.

10. An electronic document management apparatus for managing document information relating to an electronic bond generated from electronic information, the apparatus comprising:

a central processing unit (CPU) coupled to a memory, wherein the central processing unit performs a process comprising:

acquiring a plurality of pieces of part identification information respectively identifiably expressing a plurality of parts of document information and a digital signature corresponding to the document information;

acquiring a preparation type, a preparer's name and a time and date of preparation of the document information as tracing information of the document information, the preparation type indicating at least one of new issuance of an electronic bond, transfer of a whole electronic bond, issuance of divided electronic bonds, and transfer of one or more than one divided electronic bonds;

managing the part identification information and the digital signature acquired by acquiring the plurality of pieces of part identification information and the digital signature and the tracing information acquired by acquiring the preparation type, the preparer's name and the time and date of preparation of the document information, in association with each other, managing, when the preparation type indicates the issuance of divided electronic bonds, the part identification information identifiably expressing amounts of the divided electronic bonds and attached with an electronic signature of the preparer's name of the issuance of divided electronic bonds; and presenting information relating to the tracing information to the user in response to a request from the user, and causing the acquiring of the plurality of pieces of part identification information and the digital signature to acquire the document information and the acquiring of the preparation type, the preparer's name and the time and date of preparation of the document information to acquire the tracing information in response to a directive from the use, wherein the acquiring of pieces of part identification information acquires the hash information generated by using each part of the document information as part identification information, and the hash information is generated by adding the time information to the information of each of the parts of the document information.

11. The electronic document management apparatus according to claim 10, wherein the process further comprises presenting the tracing information in a predetermined format and supporting the verification by the user of the properness of the document information.

12. The electronic document management apparatus according to claim 10, wherein
the acquiring of pieces of part identification information acquires the part identification information and the digital signature by transmitting a predetermined electronic form prepared by using electronic data from the electronic document management apparatus to a user terminal in response to a request from the user and receiving the data on the predetermined lines input from the user terminal, using the predetermined electronic form.

* * * * *